United States Patent
Abdelghaffar et al.

(10) Patent No.: US 12,425,176 B2
(45) Date of Patent: Sep. 23, 2025

(54) TRANSMISSION CONFIGURATION INDICATION STATE RESTRICTION FOR SUB-BAND FULL-DUPLEX COMMUNICATIONS

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US); Abdelrahman Mohamed Ahmed Mohamed Ibrahim, San Diego, CA (US); Ahmed Attia Abotabl, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/299,983

(22) Filed: Apr. 13, 2023

(65) Prior Publication Data

US 2024/0348414 A1    Oct. 17, 2024

(51) Int. Cl.
*H04L 5/14* (2006.01)

(52) U.S. Cl.
CPC ................... *H04L 5/1423* (2013.01)

(58) Field of Classification Search
CPC .................................................. H04L 5/1423
See application file for complete search history.

(56) References Cited

U.S. PATENT DOCUMENTS

2022/0407669 A1    12/2022    Zhang et al.

FOREIGN PATENT DOCUMENTS

| WO | 2021217298 A1 | 11/2021 | |
|---|---|---|---|
| WO | WO-2024088158 A1 * | 5/2024 | |
| WO | WO-2024155102 A1 * | 7/2024 | ......... H04L 27/0006 |
| WO | WO-2024221237 A1 * | 10/2024 | |

OTHER PUBLICATIONS

International Search Report and Written Opinion—PCT/US2024/023030—ISA/EPO—Aug. 16, 2024.

* cited by examiner

*Primary Examiner* — Jamaal Henson
(74) *Attorney, Agent, or Firm* — Arun Swain

(57) ABSTRACT

Various aspects of the present disclosure generally relate to wireless communication. In some aspects, a user equipment (UE) may receive transmission configuration indication (TCI) state restriction information indicating that a TCI state associated with sub-band full-duplex (SBFD) communications is restricted for downlink communications. The UE may communicate in accordance with the TCI state restriction information. Numerous other aspects are described.

30 Claims, 13 Drawing Sheets

TRANSMISSION CONFIGURATION INDICATION STATE RESTRICTION FOR SUB-BAND FULL-DUPLEX COMMUNICATIONS

FIELD OF THE DISCLOSURE

Aspects of the present disclosure generally relate to wireless communication and specifically to techniques and apparatuses for transmission configuration indication state restriction for sub-band full-duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Full-duplex communication in a wireless network refers to simultaneous bi-directional communication between devices in the wireless network. For example, a user equipment (UE) operating in a full-duplex mode may transmit an uplink communication and receive a downlink communication at the same time (for example, in the same slot or the same symbol). Sub-band full-duplex (SBFD) is a type of full-duplex communication that enables a UE to transmit an uplink communication and receive a downlink communication at the same time but on different frequency resources. The frequency resources used for downlink communication may be separated from the frequency resources used for uplink communication, in the frequency domain, by a guard band. In some examples, the UE may perform physical downlink shared channel (PDSCH) repetition on consecutive physical slots. The PDSCH repetition may include repetitions of SBFD symbols and non-SBFD symbols, for example, to increase a likelihood of successful transmission and reception between the UE and a network node. In some examples, a transmission configuration indication (TCI) state may indicate a directionality or other characteristic of a beam. For example, the TCI state may be used indicate whether the beam is restricted for downlink reception or uplink transmission.

A dynamic point selection scenario may include a first transmission reception point (TRP) and a second TRP configured to perform SBFD communications, and a UE that is configured with SBFD information and that is able to be configured with more than one active TCI state. When there is repetition across SBFD and non-SBFD symbols, and/or when there is a scheduled periodic or semi-persistent scheduling (SPS) transmission or reception, the best TRP for the UE to use for the periodic or SPS transmission or reception may not be available. In one example, the first TRP may be the best TRP for the UE to use for downlink receptions and uplink transmissions. For example, the UE may determine that the first TRP is the best TRP for the downlink receptions and the uplink transmissions in accordance with one or more reference signal measurements. However, during SBFD communications, the first TRP may only be used for downlink receptions and the second TRP may only be used for uplink transmissions. If there is a configured downlink communication in the SBFD, the UE may not be able to determine TCI state information associated with receiving the downlink communication. For example, the UE may not be able to determine which beams are to be used for receiving the downlink communications. This may result in the downlink communication not being received by the UE using the best available beams, or may result in the UE not receiving the downlink communication altogether.

SUMMARY

Some aspects described herein relate to a method of wireless communication performed by a user equipment (UE). The method may include receiving transmission configuration indication (TCI) state restriction information indicating that a TCI state associated with sub-band full-duplex (SBFD) communications is restricted for downlink communications. The method may include communicating in accordance with the TCI state restriction information.

Some aspects described herein relate to a method of wireless communication performed by a network node. The method may include identifying that a TCI state associated with SBFD communications is restricted for downlink communications. The method may include transmitting TCI state restriction information indicating that the TCI state is restricted for downlink communications.

Some aspects described herein relate to a UE for wireless communication. The user equipment may include at least one memory and at least one processor coupled with the at least one memory. The at least one processor may be operable to cause the user equipment to receive TCI state restriction information indicating that a TCI state associated with SBFD communications is restricted for downlink communications. The at least one processor may be operable to cause the user equipment to communicate in accordance with the TCI state restriction information.

Some aspects described herein relate to a network node for wireless communication. The network node may include at least one memory and at least one processor coupled with the at least one memory. The at least one processor may be operable to cause the network node to identify that a TCI state associated with SBFD communications is restricted for downlink communications. The at least one processor may be operable to cause the network node to transmit TCI state restriction information indicating that the TCI state is restricted for downlink communications.

Some aspects described herein relate to a non-transitory computer-readable medium that stores a set of instructions for wireless communication by a UE. The set of instructions, when executed by one or more processors of the UE, may cause the UE to receive TCI state restriction information indicating that a TCI state associated with SBFD communications is restricted for downlink communications. The set of instructions, when executed by one or more processors of the UE, may cause the UE to communicate in accordance with the TCI state restriction information.

Some aspects described herein relate to a non-transitory computer-readable medium that stores a set of instructions for wireless communication by a network node. The set of instructions, when executed by one or more processors of the network node, may cause the network node to identify that a TCI state associated with SBFD communications is restricted for downlink communications. The set of instructions, when executed by one or more processors of the network node, may cause the network node to transmit TCI state restriction information indicating that the TCI state is restricted for downlink communications.

Some aspects described herein relate to an apparatus for wireless communication. The apparatus may include means for receiving TCI state restriction information indicating that a TCI state associated with SBFD communications is restricted for downlink communications. The apparatus may include means for communicating in accordance with the TCI state restriction information.

Some aspects described herein relate to an apparatus for wireless communication. The apparatus may include means for identifying that a TCI state associated with SBFD communications is restricted for downlink communications. The apparatus may include means for transmitting TCI state restriction information indicating that the TCI state is restricted for downlink communications.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
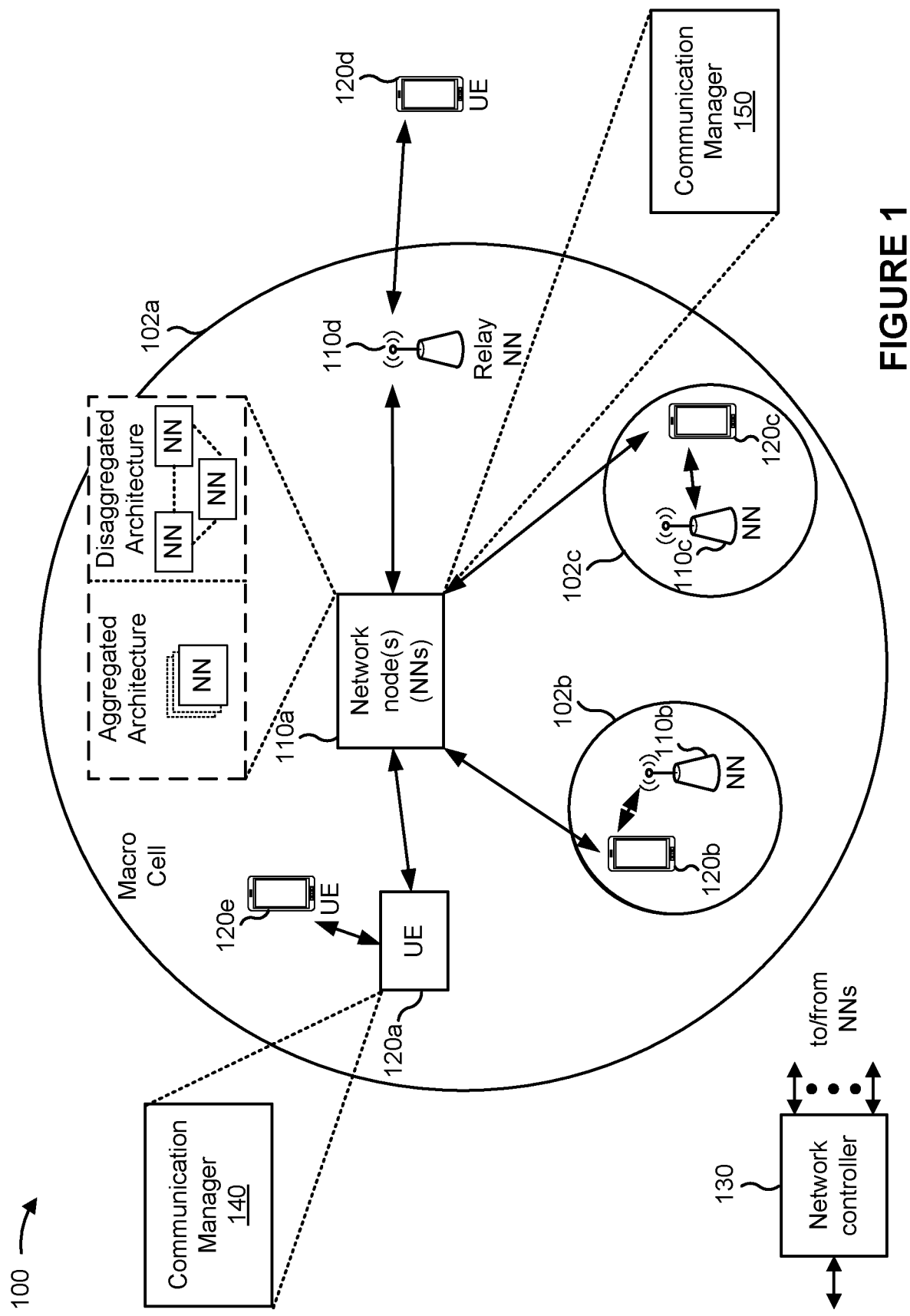
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A network node may be configured to perform full-duplex communications, such as sub-band full-duplex (SBFD) communications, while a user equipment (UE) may only be configured to perform half-duplex communications. However, the UE may be configured with SBFD information. For example, the UE may be configured with SBFD symbols and slots, and may be configured with downlink and uplink sub-band locations (for example, in a frequency domain) within the SBFD symbols and slots. The UE may use this information to enhance or optimize transmission and reception filters, among other examples.

Spatial isolation between transmission and reception panels may be used to enable full-duplex communications at the network node. In some examples, using two transmission reception points (TRPs) that are spatially separated may provide sufficient isolation, thereby reducing or eliminating the need for the TRPs to include electromagnetic absorbers. In some examples, most or all of the beams associated with the TRPs may have the same directionality during SBFD operation to avoid interference between multiple TRPs in the same sector. When the UE is in a radio resource control (RRC) connected state, the UE may receive a higher layer parameter (for example, as part of a cell configuration) that indicates the duplex mode to be used. This RRC configuration may be in addition to cell-specific or common parameters for the time and frequency location of the uplink and downlink sub-bands. In some examples, the SBFD may be co-located or non-co-located. Co-located SBFD includes SBFD that is performed using two panels that are under a single radome and/or in close proximity to each other. In contrast, non-co-located SBFD includes SBFD communications that is performed using panels used (for a full-duplex network node) that are physically separated and where the panels and/or TRPs are assigned a fixed direction (uplink or downlink) during the SBFD communications. This may result in some beams or beam directions not being available (for example, being restricted) since the corresponding panel and/or TRP is using a fixed communication mode. For example, a UE may have an active TCI state associated with a TRP. The UE may use the TCI state for uplink and downlink communication with the TRP in non-SBFD symbols. For SBFD operation, the TRP may only be used for UL communication. In this example, the TCI state may not be used for downlink communication. The UE may be indicated that the TCI is restricted, for example, may not be used for DL channel and signal reception in the SBFD symbols.

In a unified transmission configuration indication (TCI) framework, the network node may support common TCI state ID update and activation to provide common quasi co-location (QCL) information or common uplink transmission spatial filter or filters across a set of configured component carriers. This type of beam indication may apply to intra-band carrier aggregation, as well as to joint downlink and uplink and separate downlink and uplink beam indications. The common TCI state ID may imply that one reference signal determined in accordance with the TCI state(s) indicated by a common TCI state ID is used to provide QCL Type-D indication (in addition to QCL Type A, Type B or Type C for large scale channel parameters) and to determine uplink transmission spatial filters across the set of configured component carriers. In a unified TCI state framework, a TCI state may be provided for downlink beams and uplink beams. In some examples, there may be two TCI state indication modes in the unified TCI state framework. A first mode may be a separate downlink and uplink TCI state indication mode, in which separate downlink and uplink TCI states are used to indicate downlink and uplink beam directions for the UE. A second mode may be a joint downlink and uplink TCI state indication mode, in which a TCI state indication is used to indicate, to the UE, a joint uplink and downlink beam direction.

Various aspects relate generally to transmission configuration indication (TCI) state restriction. Some aspects more specifically relate to TCI state restriction for sub-band full-duplex (SBFD) communications. In some aspects, a user equipment (UE) may receive TCI state restriction information indicating that a TCI state is restricted for downlink communications in SBFD symbols. In one example, the UE may be configured with unified TCI state information that supports common TCI state updating and activation. In this example, the UE may receive a TCI codepoint that includes the TCI state restriction information. In another example, the UE may not be configured with the unified TCI state information. In this example, the UE may receive radio resource control (RRC) information or medium access control (MAC) information that includes the TCI state restriction information. For example, a bit included in the RRC information or the MAC information may indicate that a corresponding downlink or uplink TCI state is not able to be used in an SBFD symbol or slot. The UE may communicate in accordance with the TCI state restriction information. For example, the UE may selectively receive in accordance with TCI state restriction information indicating whether a beam is restricted for downlink transmissions.

Particular aspects of the subject matter described in this disclosure can be implemented to realize one or more of the following potential advantages. In some examples, by receiving the TCI state restriction information, some aspects enable the UE to identify whether a TCI state is restricted for downlink communications. For example, the UE may identify whether to switch beams for performing PDSCH reception across SBFD and non-SBFD slots and symbols. In some examples, by communicating in accordance with the TCI state restriction information, some aspects enable the UE to receive a communication from a network node using a correct beam, such as a beam with certain QCL properties. This may improve communication quality and may reduce a likelihood of dropped communications between the UE and the network node, among other benefits described herein.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some examples, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave." if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive TCI state restriction information indicating that a TCI state associated with SBFD communications is restricted for downlink communications; and communicate in accordance with the TCI state restriction information. Additionally, or alternatively, the communication manager 140 may perform one or more other operations described herein.

In some aspects, the network node 110 may include a communication manager 150. As described in more detail elsewhere herein, the communication manager 150 may identify that a TCI state associated with SBFD communications is restricted for downlink communications; and transmit TCI state restriction information indicating that the TCI state is restricted for downlink communications. Additionally, or alternatively, the communication manager 150 may perform one or more other operations described herein.

Figure 2:
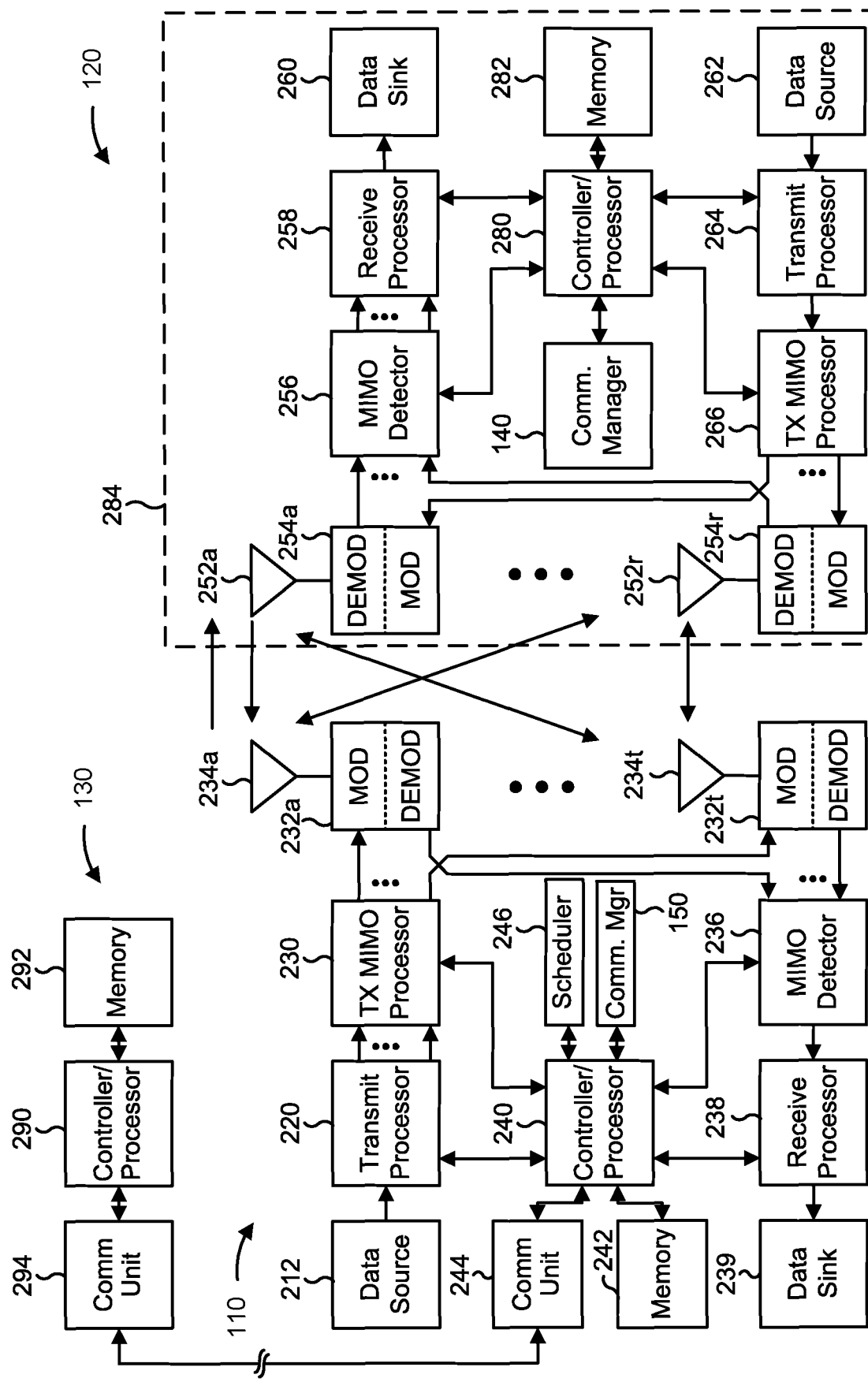
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 in accordance with one or more channel quality indicators (CQIs) received from that UE 120. The network node 110 may process (for example, encode and modulate) the data for the UE 120 in accordance with the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with TCI state restriction for SBFD communications, as described in more detail elsewhere herein. For example, the controller/processor 240 of the network node 110, the controller/processor 280 of the UE 120, or any other component(s) of FIG. 2 may perform or direct operations of, for example, process 1100 of FIG. 11, process 1200 of FIG. 12, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1100 of FIG. 11, process 1200 of FIG. 12, or other processes as described herein. In some examples, executing instructions may include running the instructions, converting the instructions, compiling the instructions, or interpreting the instructions, among other examples.

In some aspects, the UE 120 includes means for receiving TCI state restriction information indicating that a TCI state associated with SBFD communications is restricted for downlink communications; and/or means for communicating in accordance with the TCI state restriction information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for identifying that a TCI state associated with SBFD communications is restricted for downlink communications; and/or means for transmitting TCI state restriction information indicating that the TCI state is restricted for downlink communications. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
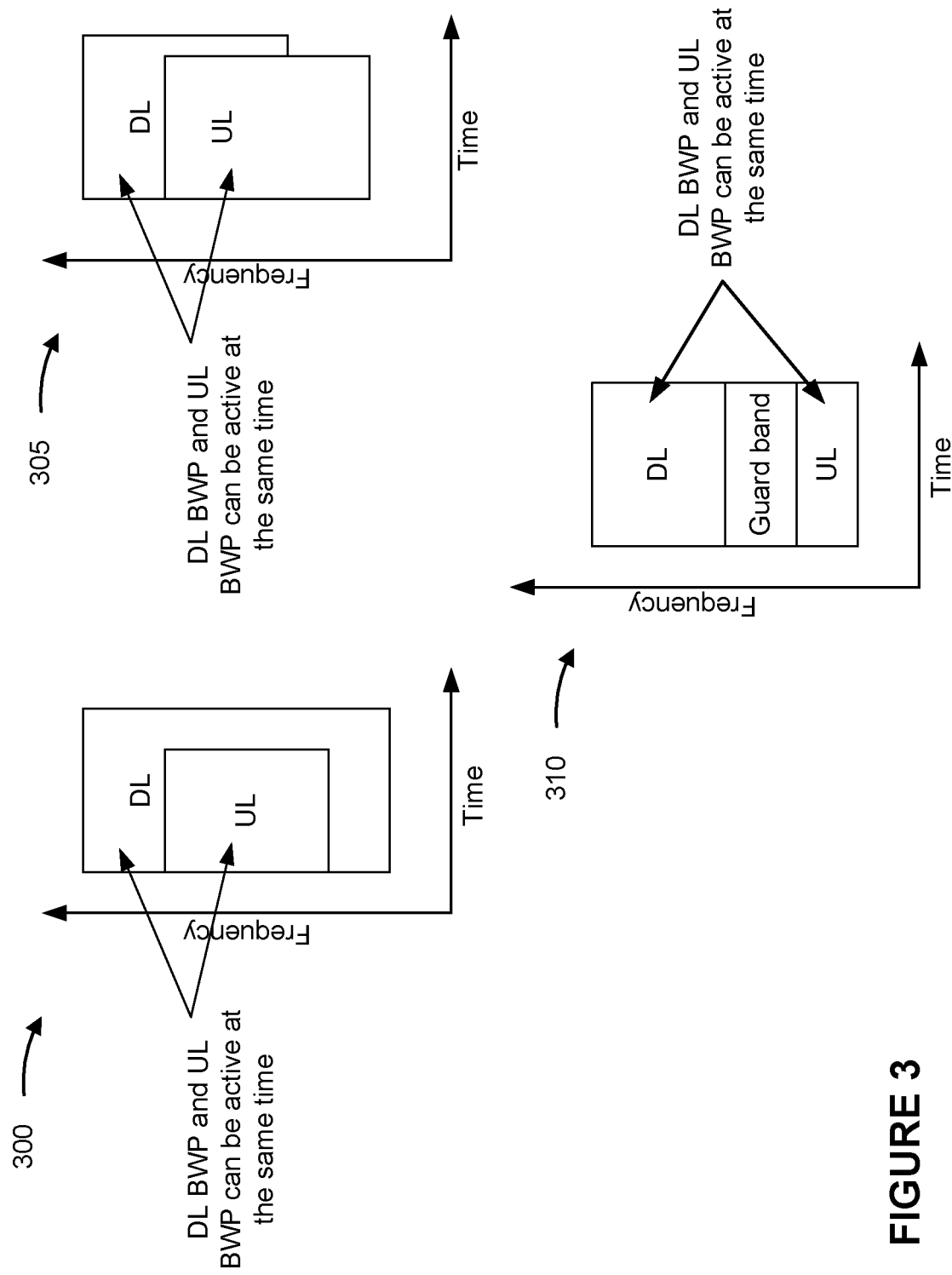
FIG. 3 is a diagram illustrating examples of full-duplex communication in a wireless network, in accordance with the present disclosure.

FIG. 3 is a diagram illustrating examples 300, 305, and 310 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (for example, in the same slot or the same symbol). "Half-duplex communication" in a wireless network refers to unidirectional communications (for example, only downlink communication or only uplink communication) between devices at a given time (for example, in a given slot or a given symbol).

As shown in FIG. 3, examples 300 and 305 show examples of in-band full-duplex (IBFD) communication. In IBFD, a UE may transmit an uplink communication to a base station and receive a downlink communication from the base station on the same time and frequency resources. As shown in example 300, in a first example of IBFD, the time and frequency resources for uplink communication may fully overlap with the time and frequency resources for downlink communication. As shown in example 305, in a second example of IBFD, the time and frequency resources for uplink communication may partially overlap with the time and frequency resources for downlink communication.

As further shown in FIG. 3, example 310 shows an example of sub-band full-duplex (SBFD) communication, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

Figure 4:
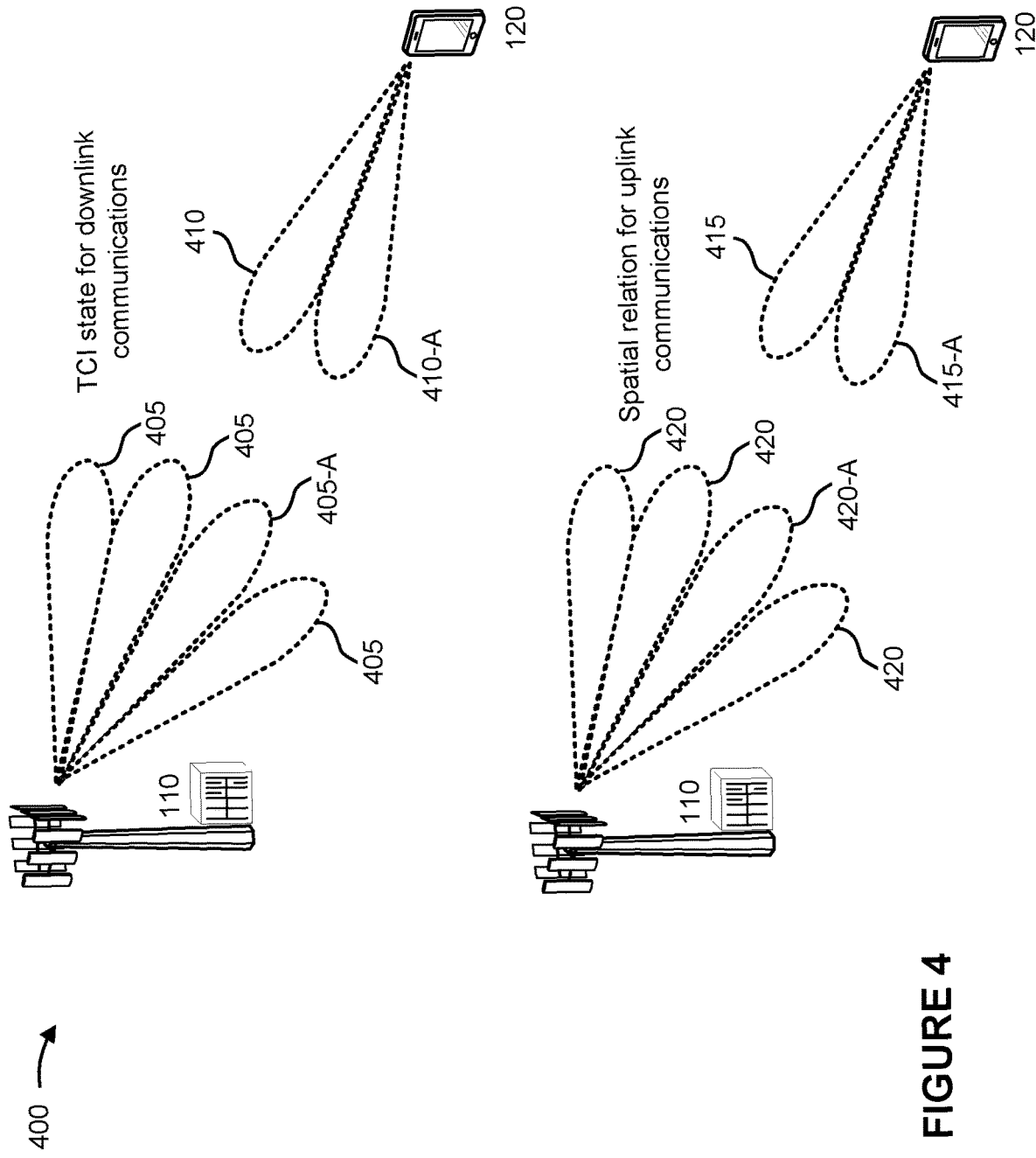
FIG. 4 is a diagram illustrating an example of using beams for communications between a network node and a UE, in accordance with the present disclosure.

FIG. 4 is a diagram illustrating an example 400 of using beams for communications between a network node and a UE, in accordance with the present disclosure. As shown in FIG. 4, a network node 110 and a UE 120 may communicate with one another.

The network node 110 may transmit to UEs 120 located within a coverage area of the network node 110. The network node 110 and the UE 120 may be configured for beamformed communications, where the network node 110 may transmit in the direction of the UE 120 using a directional NN transmit beam (for example, a BS transmit beam), and the UE 120 may receive the transmission using a directional UE receive beam. Each NN transmit beam may have an associated beam ID, beam direction, or beam symbols, among other examples. The network node 110 may transmit downlink communications via one or more NN transmit beams 405.

The UE 120 may attempt to receive downlink transmissions via one or more UE receive beams 410, which may be configured using different beamforming parameters at receive circuitry of the UE 120. The UE 120 may identify a particular NN transmit beam 405, shown as NN transmit beam 405-A, and a particular UE receive beam 410, shown as UE receive beam 410-A, that provide relatively favorable performance (for example, that have a best channel quality of the different measured combinations of NN transmit beams 405 and UE receive beams 410). In some examples, the UE 120 may transmit an indication of which NN transmit beam 405 is identified by the UE 120 as a preferred NN transmit beam, which the network node 110 may select for transmissions to the UE 120. The UE 120 may thus attain and maintain a beam pair link (BPL) with the network node 110 for downlink communications (for example, a combination of the NN transmit beam 405-A and the UE receive beam 410-A), which may be further refined and maintained in accordance with one or more established beam refinement procedures.

A downlink beam, such as an NN transmit beam 405 or a UE receive beam 410, may be associated with a transmission configuration indication (TCI) state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each NN transmit beam 405 may be associated with a synchronization signal block (SSB), and the UE 120 may indicate a preferred NN transmit beam 405 by transmitting uplink transmissions in resources of the SSB that are associated with the preferred NN transmit beam 405. A particular SSB may have an associated TCI state (for example, for an antenna port or for beamforming). The network node 110 may, in some examples, indicate a downlink NN transmit beam 405 in accordance with antenna port QCL properties that may be indicated by the TCI state. A TCI state may be associated with one downlink reference signal set (for example, an SSB and an aperiodic, periodic, or semi-persistent channel state information (CSI) reference signal (RS) (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs in accordance with the network node 110 indicating an NN transmit beam 405 via a TCI indication.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a physical downlink shared channel (PDSCH). The set of activated TCI states for downlink control channel communications may correspond to beams that the network node 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations in accordance with the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network node 110 using a directional UE transmit beam, and the network node 110 may receive the transmission using a directional NN receive beam. Each UE transmit beam may have an associated beam ID, beam direction, or beam symbols, among other examples. The UE 120 may transmit uplink communications via one or more UE transmit beams 415.

The network node 110 may receive uplink transmissions via one or more NN receive beams 420 (for example, BS receive beams). The network node 110 may identify a particular UE transmit beam 415, shown as UE transmit beam 415-A, and a particular NN receive beam 420, shown as NN receive beam 420-A, that provide relatively favorable performance (for example, that have a best channel quality of the different measured combinations of UE transmit beams 415 and NN receive beams 420). In some examples, the network node 110 may transmit an indication of which UE transmit beam 415 is identified by the network node 110 as a preferred UE transmit beam, which the network node 110 may select for transmissions from the UE 120. The UE 120 and the network node 110 may thus attain and maintain a BPL for uplink communications (for example, a combination of the UE transmit beam 415-A and the NN receive beam 420-A), which may be further refined and maintained in accordance with one or more established beam refinement procedures. An uplink beam, such as a UE transmit beam 415 or an NN receive beam 420, may be associated with a spatial relation. A spatial relation may indicate a directionality or a characteristic of the uplink beam, similar to one or more QCL properties, as described above.

Figure 5:
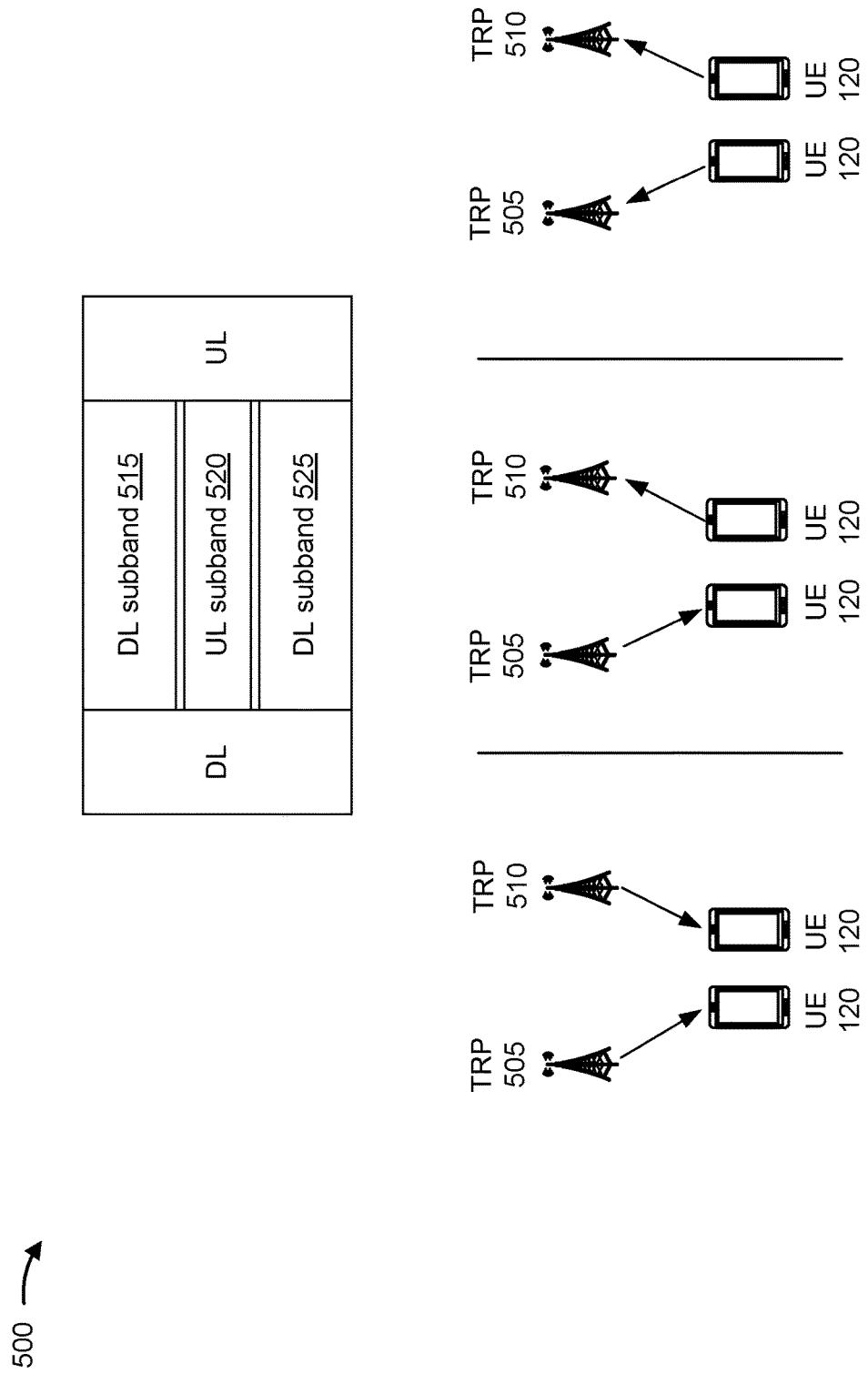
FIG. 5 is a diagram illustrating an example of spatial isolation for full-duplex communications, in accordance with the present disclosure.

FIG. 5 is a diagram illustrating an example 500 of spatial isolation for full-duplex communications, in accordance with the present disclosure.

In some examples, the network node 110 may be configured to perform full-duplex communications, such as SBFD communications. The UE 120 may be configured to perform half-duplex configurations. In some examples, the UE 120 may not be configured to perform SBFD communications. However, the UE 120 may be configured with SBFD information. For example, the UE 120 may be configured with SBFD symbols and slots, and may be configured with downlink and uplink sub-band locations (for example, in a frequency domain) within the SBFD symbols and slots. The UE 120 may use this information to enhance or optimize transmission and reception filters, among other examples.

Spatial isolation between transmission and reception panels may be used to enable full-duplex communications at the network node 110. In some examples, using two TRPs that are spatially separated may provide sufficient isolation, thereby reducing or eliminating the need for the TRPs to include electromagnetic absorbers. In some examples, most or all of the beams associated with the TRPs may have the same directionality during SBFD to avoid co-site interference.

When the UE 120 is in an RRC-connected state, the UE 120 may receive a higher layer parameter (for example, as part of a cell configuration) that indicates the duplex mode to be used. This RRC configuration may be in addition to cell-specific or common parameters for the time and frequency location of the uplink and downlink sub-bands. In some examples, the SBFD may be co-located or non-co-located. Co-located SBFD includes to SBFD that is performed using two panels that are under a single radome and/or in close proximity to each other. In contrast, non-co-located SBFD includes SBFD communications that is performed using panels used (for a full-duplex network node) that are physically separated and where the panels and/or TRPs are assigned a fixed direction (uplink or downlink) during the SBFD communications. This may result in some beams or beam directions not being available (for example, being restricted) since the corresponding panel and/or TRP is using a fixed communication mode. Additionally, beam correspondence may not be applicable for non-co-located SBFD.

In a unified TCI framework, the network node 110 may support common TCI state ID update and activation to provide common QCL information or common uplink transmission spatial filter or filters across a set of configured component carriers. This type of beam indication may apply to intra-band carrier aggregation (CA), as well as to joint downlink and uplink (DL/UL) and separate downlink and uplink beam indications. The common TCI state ID may imply that one reference signal (RS) determined in accordance with the TCI state(s) indicated by a common TCI state ID is used to provide QCL Type-D indication and to determine UL transmission spatial filters across the set of configured component carriers. In a unified TCI state framework, a TCI state may be provided for downlink (DL) beams and uplink (UL) beams. In some examples, a joint uplink and downlink TCI state may be defined that indicates a common beam for both uplink communications and downlink communications. In some examples, separate TCI states may be defined for uplink communications and downlink communications, such as one or more uplink TCI states and one or more downlink TCI states.

Some networks may use different beam indication types for indicating one or more beams to use for communication via a set of channels. A beam indication may be, or include, a TCI state information element, a beam ID, spatial relation information, a TCI state ID, a closed loop index, a panel ID, a TRP ID, and/or a sounding reference signal (SRS) set ID, among other examples. In some examples, types of beam indication types may include a beam indication that indicates to use a common beam for multiple channels or resources for reference signals, or beam indication types that include a single beam indication that indicates to use a beam for a single channel or a resource for reference signals. As used herein, a unified TCI state indication may refer to a TCI state indication using the unified TCI framework.

For example, a unified TCI state indication may include an indication of a TCI state that may be applied to multiple channels and/or reference signals. For example, a TCI state may be used for a downlink beam indication, and a spatial relation may be used for an uplink beam indication. Such beam indications may be referred to herein as "non-unified beam indications." Non-unified beam indications may be applied to one channel for one communication scheduled in that channel.

In some examples, the network node 110 and the UE 120 may use a unified TCI framework for both downlink and uplink beam indications. In the unified TCI framework, TCI state indications may be used to indicate a joint downlink and uplink TCI state or to indicate separate downlink and uplink TCI states. Such a TCI state indication that may be used to indicate a joint downlink and uplink beam, a separate downlink beam, or a separate uplink beam is referred to herein as a "unified TCI state indication." A unified TCI state indication (for example, a joint downlink and uplink TCI state indication and/or separate downlink and uplink TCI state indications) may be applied to multiple channels. For example, the unified TCI state indication of a joint uplink and downlink TCI state may be used to indicate a beam direction for one or more downlink channels (for example, PDSCH and/or PDCCH) or reference signals (for example, CSI-RS) and for one or more uplink channels (for example, physical uplink shared channel (PUSCH) and/or physical uplink control channel (PUCCH)) or reference signals (for example, an SRS). The unified TCI state indication of a separate downlink TCI state may be used to indicate a beam direction for multiple downlink channels (for example, PDSCH and PDCCH) or reference signals (for example, CSI-RS). The unified TCI state indication of a separate uplink TCI state may be used to indicate a beam direction to be used for multiple uplink channels (for example, PUSCH and PUCCH) or reference signals (for example, SRS). In some examples, the unified TCI state indication may be "sticky," such that the indicated beam direction will be used for the channels and/or reference signals to which the TCI state indication applies until a further indication is received.

In some examples, there may be two TCI state indication modes in the unified TCI state framework. A first mode may be a separate downlink and uplink TCI state indication mode, in which separate downlink and uplink TCI states are used to indicate downlink and uplink beam directions for the UE. For example, the separate downlink and uplink TCI state indication mode may be used when the UE is having maximum permissible exposure (MPE) issues to indicate different beam directions, for the UE, for an uplink beam (for example, a UE Tx beam) and a downlink beam (for example, a UE Rx beam). A second mode may be a joint downlink and uplink TCI state indication mode, in which a TCI state indication is used to indicate, to the UE, a joint uplink and downlink beam direction. For example, the joint downlink and uplink TCI state indication mode may be used when the UE has channel correspondence between downlink and uplink channels (which may be assumed in some examples), and the same beam direction can be used for an uplink beam (for example, a UE Tx beam) and a downlink beam (for example, a UE Rx beam).

A dynamic point selection scenario may include a first TRP 505 and a second TRP 510 configured to perform SBFD communications, and a UE 120 that is configured with SBFD information and that is able to be configured with more than one active TCI state. When there is repetition across SBFD and non-SBFD symbols, and/or when there is a scheduled periodic or semi-persistent scheduling (SPS) transmission or reception, the best TRP for the UE 120 to use for the periodic or SPS transmission or reception may not be available. In one example, the first TRP 505 may be the best TRP for the UE 120 to use for downlink receptions and uplink transmissions. For example, the UE 120 may determine that the first TRP 505 is the best TRP for the downlink receptions and the uplink transmissions in accordance with one or more reference signal measurements. However, during SBFD communications, such as SBFD communications using DL sub-band 515, UL sub-band 520, and/or DL sub-band 525, the first TRP 505 may only be used for downlink receptions and the second TRP 510 may only be used for uplink transmissions. If there is a configured downlink communication in the SBFD symbols (for example, using PDSCH repetition or SPS), the UE 120 may not be able to determine TCI state information associated with receiving the downlink communication. For example, the UE 120 may not be able to determine which beams are to be used for receiving the downlink communications. This may result in the downlink communication not being received by the UE 120 using the best available beams, or may result in the UE 120 not receiving the downlink communication altogether.

Various aspects relate generally to TCI state restriction. Some aspects more specifically relate to TCI state restriction for SBFD communications. In some aspects, a UE may receive TCI state restriction information indicating that a TCI state associated with SBFD communications is restricted for downlink communications. In one example, the UE may be configured with unified TCI state information that supports common TCI state updating and activation. In this example, the UE may receive a TCI codepoint that includes the TCI state restriction information. The TCI codepoint may include a plurality of bits (e.g., eight bits) associated with a respective plurality of SBFD slots, where each bit indicates a TCI state restriction for the corresponding SBFD slot. In another example, the UE may not be configured with the unified TCI state information. In this example, the UE may receive RRC information or MAC information that includes the TCI state restriction information. For example, a bit included in the RRC information or the MAC information may indicate that a corresponding downlink or uplink TCI state is not able to be used in an SBFD slot. The UE may communicate in accordance with the TCI state restriction information. For example, the UE may selectively transmit in accordance with TCI state restriction information indicating whether a beam is restricted for downlink transmissions.

Particular aspects of the subject matter described in this disclosure can be implemented to realize one or more of the following potential advantages. In some examples, by communicating in accordance with TCI state restriction information, the described techniques can be used to improve communication quality and to reduce a likelihood of dropped or incomplete communications, among other benefits.

Figure 6:
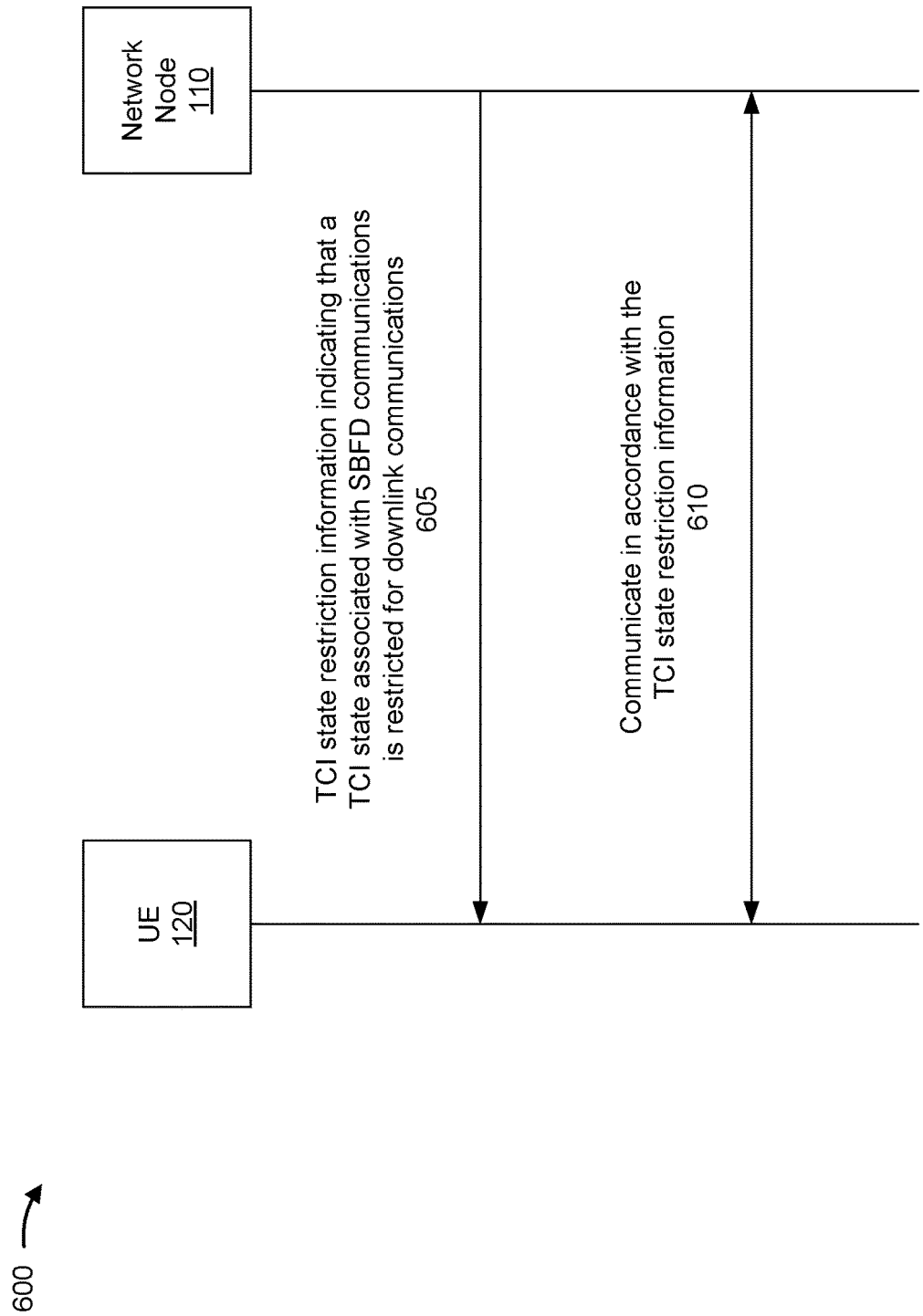
FIG. 6 is a diagram illustrating an example of transmission configuration indication (TCI) state restriction for subband full-duplex (SBFD) communications, in accordance with the present disclosure.

FIG. 6 is a diagram illustrating an example 600 of TCI state restriction for SBFD communications, in accordance with the present disclosure.

As shown in connection with operation 605, the network node 110 may transmit, and the UE 120 may receive, TCI state restriction information. The TCI state restriction information may indicate that a TCI state associated with SBFD communications is restricted for downlink communications.

In some aspects, the UE 120 may be configured with unified TCI state information, for example, in accordance with the unified TCI framework described herein. In this case, the TCI state restriction information may be included in a TCI codepoint. For example, the UE 120 may receive an extended TCI codepoint that indicates duplex-specific uplink and downlink TCI states.

In some aspects, the UE 120 may not be configured with the unified TCI state information. In this case, the TCI state restriction information may be received via RRC information or MAC information (such as a MAC control element (MAC-CE)). For example, the UE 120 may receive RRC information or a MAC-CE that includes an indication of downlink (or uplink) TCI restriction or non-availability for SBFD communications. In some aspects, a bit included in the RRC information or MAC-CE may indicate that a corresponding downlink (or uplink) TCI state is not available or is not able to be used in the SBFD slots. In some aspects, the MAC-CE may activate up to two (for example, one or two) downlink (or uplink) TCI states per TCI codepoint. A first TCI state may correspond to half-duplex communications and a second TCI state may correspond to SBFD communications. In some aspects, the MAC-CE may associated each TCI state of a plurality of TCI states with a corresponding applicable duplex mode. For example, a first state of a bit may indicate to use half-duplex communications and a second state of the bit may indicate to use full-duplex communications. In some aspects, if a downlink TCI is restricted in SBFD, it may be (implicitly) determined that UL TCI is not restricted. For example, if an RS associated with spatialRelationInfo is restricted for uplink, it is implicitly available for downlink reception. Alternatively, if an uplink TCI is restricted in SBFD, it may be (implicitly) determined that DL TCI is not restricted.

In some aspects, PDSCH repetition (slotAggregation) may be in accordance with consecutive physical slots. In some aspects, the UE 120 may be configured with SBFD information and may be configured (for example, via RRC or indicated dynamic grant (DG)) with DL PDSCH repetition across SBFD and non-SBFD symbols. If the UE 120 supports the unified TCI framework, the UE 120 may be configured to switch beams across a slot boundary and to continue PDSCH repetition using a different beam. Alternatively, if the UE 120 does not support the unified TCI framework, the UE 120 may be configured to continue PDSCH repetition reception in accordance with the configured or indicated TCI state being available. In some aspects, scheduling or activating downlink control information (DCI) may indicate two TCI states (for example, one codepoint may be used to indicate half-duplex and full-duplex TCI states), where each PDSCH occasion is received with a downlink TCI state indication associated with the corresponding duplex mode. Alternatively, if one of the indicated TCI states is not available (due to being restricted), the PDSCH repetition occasion may be counted and dropped. Additional details regarding these features are described in connection with FIG. 8.

In some aspects, a duplex-specific SPS may be used for a configured grant (CG) transmission in full-duplex symbols or slots, where SPS transmission occasions in an opposite duplex mode (e.g., non-full duplex symbols) are dropped. In some other aspects, a same SPS may be used across different duplex modes with two sets of parameters, and the UE 120 may be configured to select one of the duplex modes in accordance with a corresponding slot for the transmission occasion.

In some aspects, in accordance with the UE 120 supporting the duplex-specific unified TCI framework, and in accordance with the duplex type of the transmission occasion, the UE 120 may use the downlink TCI state of the corresponding duplex mode. This may apply whether the network node 110 is configured with the duplex-specific SPS or the same SPS.

In some aspects, in accordance with the UE 120 not supporting the unified TCI framework, and in accordance with the same SPS being used across different duplex types and the activating DCI indicating two TCI states (for example, one codepoint that indicates half-duplex and full-duplex TCI states), each transmission occasion may be received with the downlink TCI state of the associated duplex mode.

In some aspects, in accordance with the UE 120 not supporting the unified TCI framework, and in accordance with the same SPS being used across different duplex types and the activating DCI indicating a single TCI state, an SPS occasion associated with a non-available downlink TCI state may be dropped.

In some aspects, when a single DCI schedules multiple PDSCH occasions over non-consecutive slots, each PDSCH occasion may have an associated slot and length indicator value (SLIV) and may share a same modulation and coding scheme (MCS) and/or frequency domain resource allocation (FDRA). In some aspects, different FDRA or MCS may be used for transport blocks in SBFD and non-SBFD slots. For example, a first FDRA or MCS may be used for transport blocks in SBFD slots and a second FDRA or MCS may be used for transport blocks in non-SBFD slots.

In some aspects, in accordance with the UE 120 supporting the duplex-specific extended unified TCI framework, and in accordance with the duplex type of each SLIV/PDSCH transmission occasions, the UE 120 may use the downlink TCI state of the corresponding duplex mode.

In some aspects, in accordance with the UE 120 not supporting the duplex-specific extended unified TCI framework, the activating or scheduling DCI may indicate two TCI states, where each TCI state corresponds to a slot-duplex type. Alternatively, if the DCI indicates a single TCI state, and the TCI state is not available in the SBFD symbols, the transport block of the PDSCH may be dropped/skipped and counted and the hybrid automatic repeat request (HARQ) process may not be incremented.

For dynamic point selection, a CSI report configuration may be associated with multiple CSI-RS resources (for example, multiple channel measurement resources (CMRs)), where each resource has a specific TCI corresponding to a specific TRP. The UE 120 may select one resource out of the N resources. When one of the TRPs is in an uplink mode, the CSI-RS may not be sent and UE 120 may not measure the CSI.

In some aspects, a CMR may be split into multiple groups (for example, M=2) within the same resource set and may be associated with different TRPs. The UE 120 may be configured not to measure the CMR for the TRPs that are in the uplink mode. For example, the CMR may be dropped. In this case, a CSI resource indicator (CRI) may be interpreted in accordance with a number of CMRs associated with the active TRP, and may be expressed as follows: Ceil ($\log_2$ ($M_1$)) or Ceil ($\log_2(M_2)$) bits. Additional details regarding these features are described in connection with FIG. 8.

In some aspects, in accordance with the UE 120 being configured with SBFD information but not supporting the unified TCI framework, a default downlink beam for PDSCH and CSI-RS communications may be determined or identified in accordance with a TCI state of a lowest CORESET ID with an available TCI state in the SBFD for downlink transmissions. The CORESET IDs may be split into two (or more) groups in accordance with the associated TRPs, and the lowest CORESET ID in a group that is mapped to a downlink available TRP may be selected. Additional details regarding these features are described in connection with FIG. 10.

As shown in connection with reference number 610, the UE 120 and the network node 110 may communicate in accordance with the TCI state restriction information. For example, the UE 120 may transmit to the network node 110 or receive from the network node 110 in accordance with the TCI state restriction information.

Figure 7:
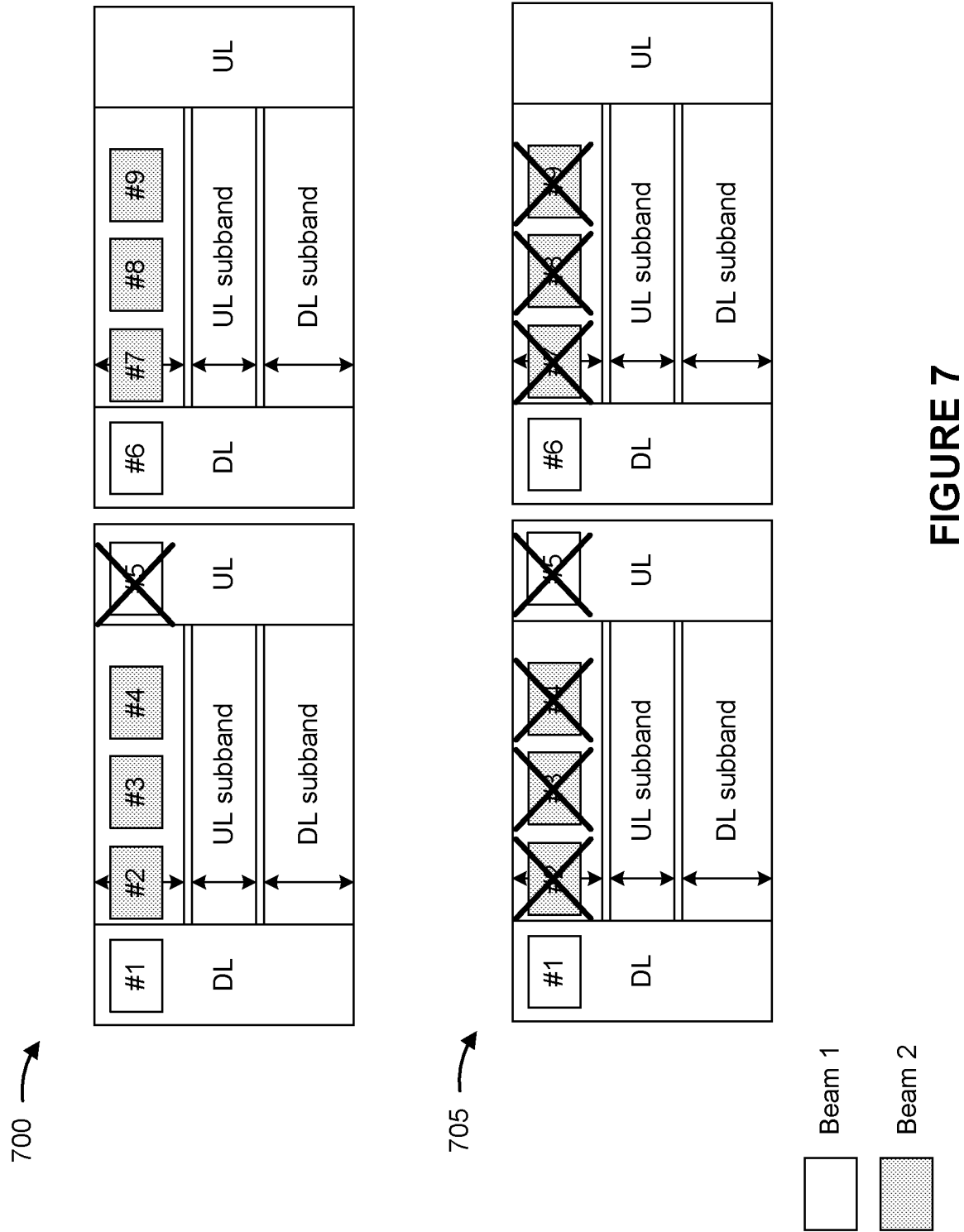
FIG. 7 is a diagram illustrating examples of downlink beam switching, in accordance with the present disclosure.

FIG. 7 is a diagram illustrating examples 700 and 705 of downlink beam switching, in accordance with the present disclosure. In some aspects, the UE 120 may be configured with SBFD information and may be configured (for example, via RRC or indicated DG) with DL PDSCH repetition across SBFD and non-SBFD symbols. If the UE 120 supports the unified TCI framework, the UE 120 may be configured to switch beams across a slot boundary and to continue PDSCH repetition using a different beam. For example, the UE 120 may be configured to perform four downlink receptions (shown as #1, #2, #3, and #4 in the example 700). The UE 120 may not be configured to perform (for example, may refrain from performing) a downlink reception in an uplink slot (shown as #5 in the example 700). If the UE 120 supports the unified TCI framework, the UE 120 may be configured to switch beams across the slot boundary and to continue downlink receptions using the different beams (shown as #6, #7, #8, and #9 in the example 700). Alternatively, if the UE 120 does not support unified TCI framework, the UE 120 may be configured to continue PDSCH repetition reception in accordance with the configured or indicated TCI state being available. If one of the indicated TCI states is not available, the PDSCH repetition occasion may be counted and dropped. As shown in the example 705, the UE 120 may perform a downlink reception (shown as #1 in the example 705) in a downlink slot and another downlink reception (shown as #6 in the example 705) in another downlink slot. The UE 120 may not be configured to perform downlink receptions in the SBFD slot.

Figure 8:
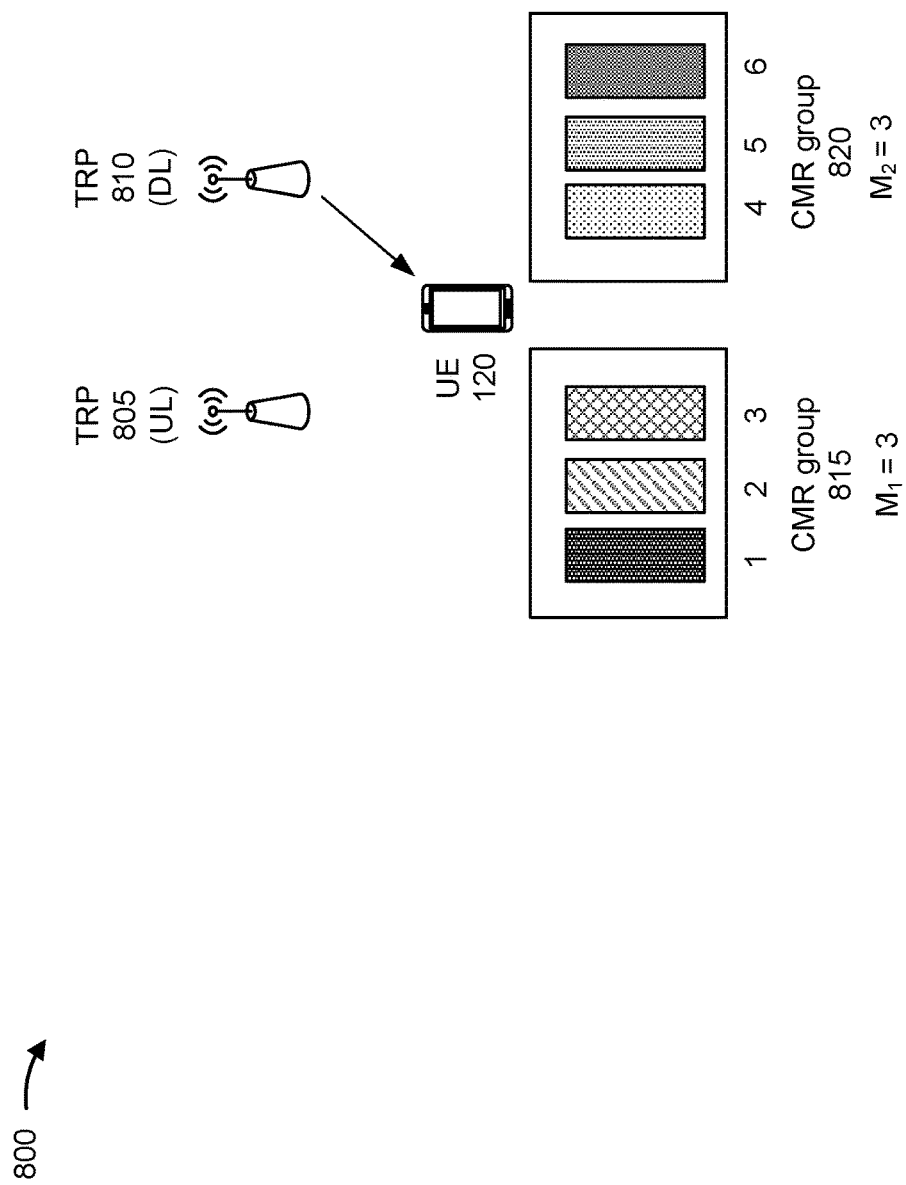
FIG. 8 is a diagram illustrating an example of channel state information reporting, in accordance with the present disclosure.

FIG. 8 is a diagram illustrating an example 800 of CSI reporting, in accordance with the present disclosure. The UE 120 may communicate with a first TRP 805 for uplink transmissions and a second TRP 810 for downlink receptions. In some aspects, the CMR resources may be split into two groups within the same resource set and may be associated with different TRPs. For example, a set of CMR resources may be split into a first CMR group 815 and a second CMR group 820. The first CMR group 815 may include a first CMR, a second CMR, and a third CMR (shown as 1, 2, and 3, respectively) and the second CMR group 820 may include a fourth CMR, a fifth CMR, and a sixth CMR (shown as 4, 5, and 6, respectively). The first CMR group 815 may be associated with uplink transmissions by the first TRP 805 and the second CMR group 820 may be associated with downlink receptions by the second TRP 810. The UE 120 may be configured not to measure the CMR for the TRPs that are in the uplink mode. For example, CMR group 815 may be dropped. A CRI may be interpreted in accordance with a number of CMRs associated with the active TRP, and may be expressed as follows: Ceil ($\log_2$ ($M_1$)) or Ceil ($\log_2(M_2)$) bits.

Figure 9:
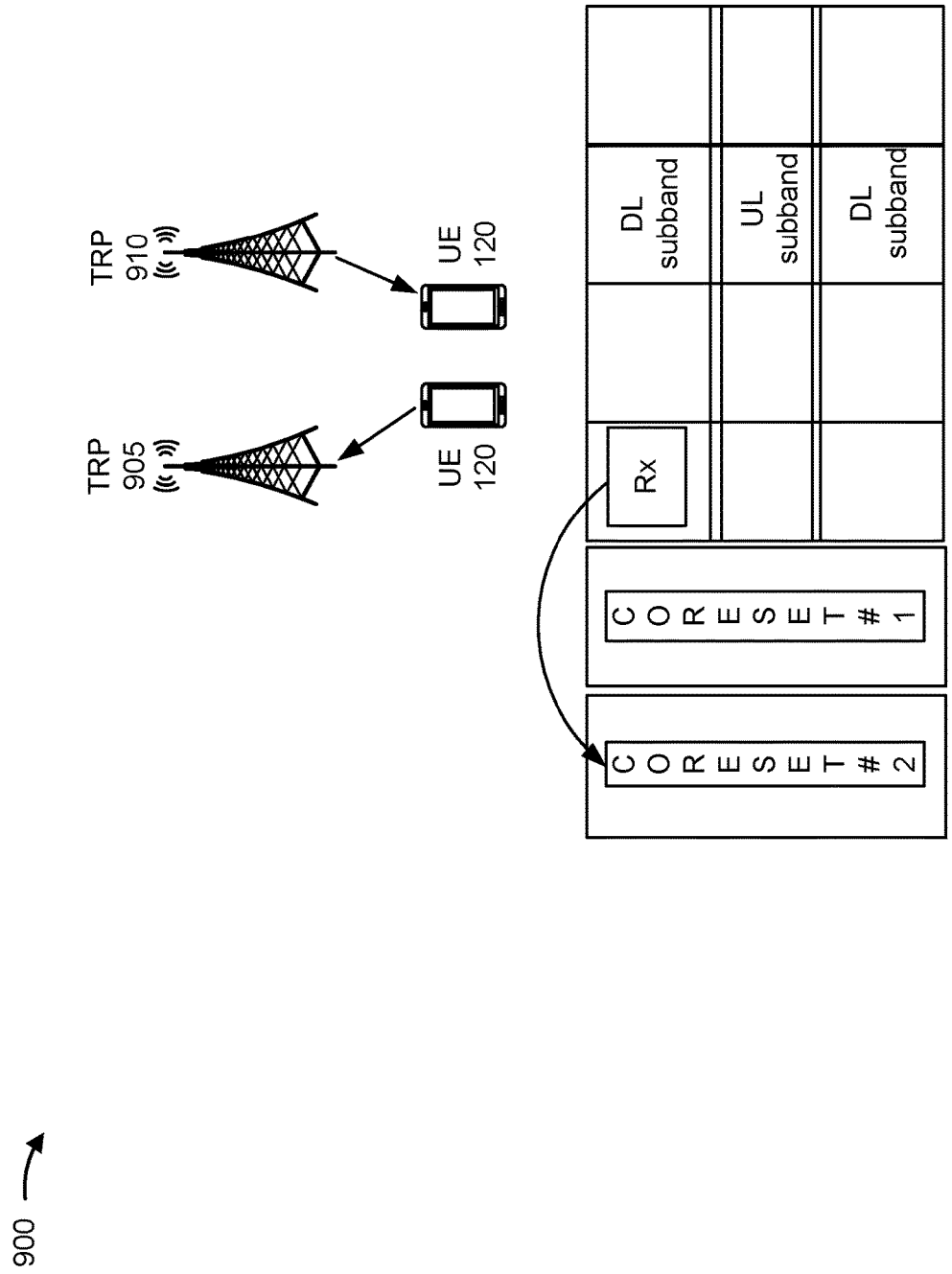
FIG. 9 is a diagram illustrating an example of a default downlink beam for physical downlink shared channel reception, in accordance with the present disclosure.

FIG. 9 is a diagram illustrating an example 900 of a default downlink beam for PDSCH reception, in accordance with the present disclosure. The UE 120 may communicate with a TRP 905 for uplink transmissions and a TRP 910 for downlink receptions. In some aspects, in accordance with the UE 120 being configured with SBFD information but not supporting the unified TCI framework, a default downlink beam for PDSCH and CSI-RS communications may be determined or identified in accordance with a TCI state of a lowest CORESET ID with an available TCI state in the SBFD for downlink transmissions. The CORESET IDs may be split into two (or more) groups in accordance with the associated TRPs, and the lowest CORESET ID in a group that is mapped to a downlink available TRP may be selected. For example, the CORESET IDS may be split into CORESET #1 and CORESET #2, and CORESET #2 may be used as a default downlink beam for PDSCH reception.

Figure 10:
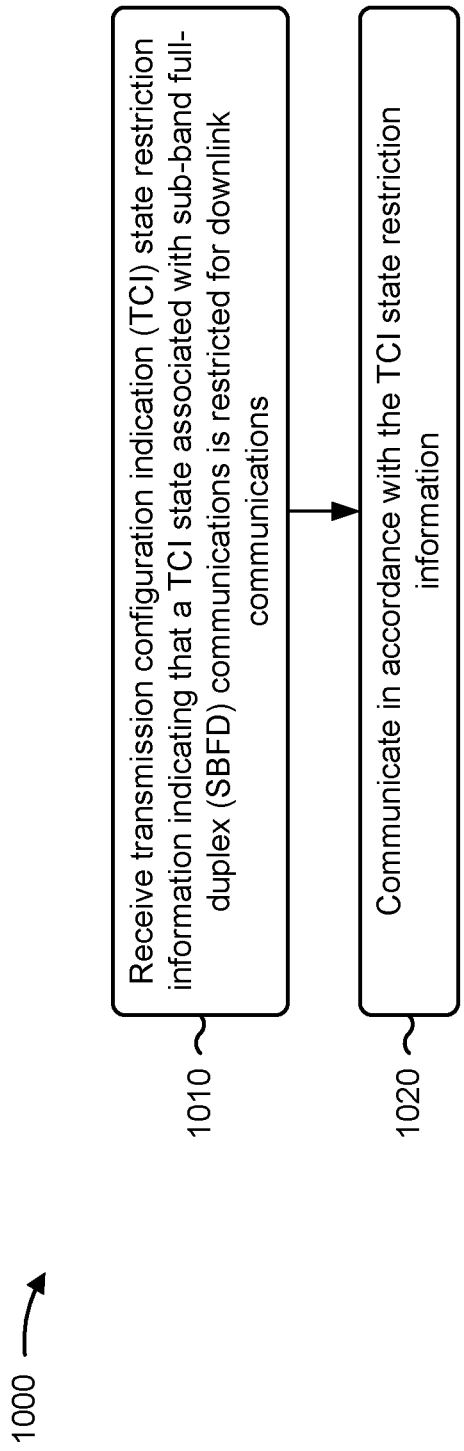
FIG. 10 is a flowchart illustrating an example process performed, for example, by a UE that supports wireless communications in accordance with the present disclosure.

FIG. 10 is a flowchart illustrating an example process 1000 performed, for example, by a UE that supports wireless communications in accordance with the present disclosure. Example process 1000 is an example where the UE (for example, UE 120) performs operations associated with TCI state restriction.

As shown in FIG. 10, in some aspects, process 1000 may include receiving transmission configuration indication (TCI) state restriction information indicating that a TCI state associated with sub-band full-duplex (SBFD) communications is restricted for downlink communications (block 1010). For example, the UE (such as by using communication manager 140 or reception component 1202, depicted in FIG. 12) May receive transmission configuration indication (TCI) state restriction information indicating that a TCI state associated with sub-band full-duplex (SBFD) communications is restricted for downlink communications, as described above.

As further shown in FIG. 10, in some aspects, process 1000 may include communicating in accordance with the TCI state restriction information (block 1020). For example, the UE (such as by using communication manager 140, reception component 1202, or transmission component 1204, depicted in FIG. 12) may communicate in accordance with the TCI state restriction information, as described above.

Process 1000 may include additional aspects, such as any single aspect or any combination of aspects described below or in connection with one or more other processes described elsewhere herein.

In a first additional aspect, the SBFD communications are associated with multi-transmission reception point communications.

In a second additional aspect, alone or in combination with the first aspect, receiving the TCI state restriction information comprises receiving a TCI codepoint associated with unified TCI information that indicates a duplex-specific uplink TCI state, a duplex-specific downlink TCI state, or a duplex-specific joint uplink and downlink TCI state.

In a third additional aspect, alone or in combination with one or more of the first and second aspects, receiving the TCI state restriction information comprises receiving radio resource control (RRC) information or medium access control (MAC) information indicating that the TCI state is restricted for downlink communications within SBFD symbols or slots.

In a fourth additional aspect, alone or in combination with one or more of the first through third aspects, the RRC information or the MAC information includes a bit indicating that a downlink TCI is not available in one or more SBFD symbols or slots.

In a fifth additional aspect, alone or in combination with one or more of the first through fourth aspects, the MAC information activates two downlink TCI states associated with a TCI codepoint, a first downlink TCI state of the two downlink TCI states being associated with half-duplex downlink communications in non-SBFD symbols and a second downlink TCI state of the two downlink TCI states being associated with downlink communications in SBFD symbols or slots.

In a sixth additional aspect, alone or in combination with one or more of the first through fifth aspects, the MAC information includes a bit indicating whether the TCI state is associated with half-duplex downlink communications or SBFD downlink communications.

In a seventh additional aspect, alone or in combination with one or more of the first through sixth aspects, process 1000 includes switching a beam across a slot boundary and performing physical downlink shared channel (PDSCH) repetition using another beam in accordance with the UE being configured to perform downlink PDSCH repetition across SBFD symbols and non-SBFD symbols and in accordance with the UE being configured with unified TCI information.

In an eighth additional aspect, alone or in combination with one or more of the first through seventh aspects, process 1000 includes performing physical downlink shared channel (PDSCH) repetition in accordance with the UE being configured to perform downlink PDSCH repetition across SBFD symbols and non-SBFD symbols and in accordance with the UE not being configured with unified TCI information.

In a ninth additional aspect, alone or in combination with one or more of the first through eighth aspects, process 1000 includes receiving downlink control information that indicates a first TCI state associated with half-duplex downlink communications and a second TCI state associated with full-duplex downlink communications, wherein each PDSCH occasion of a plurality of PDSCH occasions indicates one of the first TCI state or the second TCI state.

In a tenth additional aspect, alone or in combination with one or more of the first through ninth aspects, process 1000 includes receiving downlink control information (DCI) that indicates a single TCI state associated with PDSCH repetition across SBFD symbols and non-SBFD symbols.

In an eleventh additional aspect, alone or in combination with one or more of the first through tenth aspects, process 1000 includes determining that the single TCI state is not available in the SBFD symbols, dropping one or more PDSCH occasions within the SBFD symbols, and counting the one or more dropped PDSCH occasions towards a number of PDSCH repetitions.

In a twelfth additional aspect, alone or in combination with one or more of the first through eleventh aspects, process 1000 includes determining that the single TCI state is available in the SBFD symbols, receiving one or more PDSCH occasions within the SBFD symbols, and counting the one or more received PDSCH occasions towards a number of PDSCH repetitions.

In a thirteenth additional aspect, alone or in combination with one or more of the first through twelfth aspects, process 1000 includes receiving a configured grant for semi-persistent scheduling (SPS) for a physical downlink shared channel (PDSCH) associated with a first duplex mode, wherein the UE is configured to drop an SPS transmission occasion in accordance with the SPS transmission occasion being associated with a second duplex mode that is different than the first duplex mode.

In a fourteenth additional aspect, alone or in combination with one or more of the first through thirteenth aspects, communicating comprises receiving a communication using a downlink TCI state associated with the first duplex mode in accordance with the UE being configured with unified TCI information.

In a fifteenth additional aspect, alone or in combination with one or more of the first through fourteenth aspects, process 1000 includes receiving a configured grant for semi-persistent scheduling (SPS) for a physical downlink shared channel (PDSCH) across a plurality of duplex modes that indicates a plurality of parameters, each parameter of the plurality of parameters corresponding to a duplex mode of the plurality of duplex modes.

In a sixteenth additional aspect, alone or in combination with one or more of the first through fifteenth aspects, the SPS is used across a plurality of duplex modes, wherein activating downlink control information indicates a plurality of TCI states to be used across the plurality of duplex modes, and wherein each SPS occasion of a plurality of SPS occasions is associated with a TCI state of the plurality of TCI states associated with a duplex mode for the SPS occasion.

In a seventeenth additional aspect, alone or in combination with one or more of the first through sixteenth aspects, process 1000 includes dropping an SPS occasion of a plurality of SPS occasions associated with a non-available TCI state, wherein the SPS is used across a plurality of duplex modes, and wherein activating downlink control information indicates that a single TCI state is to be used across the plurality of duplex modes.

In an eighteenth additional aspect, alone or in combination with one or more of the first through seventeenth aspects, process 1000 includes receiving downlink control information (DCI) that schedules a plurality of physical downlink shared channel (PDSCH) occasions over a plurality of non-consecutive slots, wherein the plurality of PDSCH occasions share a same modulation and coding scheme and frequency domain resource allocation, and wherein each PDSCH occasion is associated with a start and length indicator value (SLIV).

In a nineteenth additional aspect, alone or in combination with one or more of the first through eighteenth aspects, process 1000 includes identifying a duplex mode associated with a PDSCH occasion or a SLIV occasion, wherein communicating comprises receiving using a TCI state corresponding to the duplex mode, wherein the UE is configured with unified TCI information.

In a twentieth additional aspect, alone or in combination with one or more of the first through nineteenth aspects, the DCI indicates a plurality of TCI states, each TCI state of the plurality of TCI states corresponding to a duplex mode.

In a twenty-first additional aspect, alone or in combination with one or more of the first through twentieth aspects, the DCI indicates a single TCI state for reception across SBFD symbols and non-SBFD symbols, wherein the TCI state is restricted for the SBFD symbols, and wherein the method further comprises dropping a PDSCH reception in one or more non-SBFD slots and skipping incrementing a hybrid automatic repeat request (HARQ) process counter.

In a twenty-second additional aspect, alone or in combination with one or more of the first through twenty-first aspects, process 1000 includes receiving a channel state information (CSI) report configuration associated with a plurality of CSI reference signal (CSI-RS) resources, wherein each CSI-RS resource of the plurality of CSI-RS resources corresponds to a transmission reception point (TRP) of a plurality of TRPs, selecting a CSI-RS resource from the plurality of CSI-RS resources in accordance with a CSI-RS resource indicator (CRI), and interpreting the CRI in accordance with a plurality of channel measurement resources corresponding to the plurality of CSI-RS resources.

In a twenty-third additional aspect, alone or in combination with one or more of the first through twenty-second aspects, the plurality of channel measurement resources are associated with a plurality of groups within a same resource set and are associated with different TRPs of the plurality of TRPs.

In a twenty-fourth additional aspect, alone or in combination with one or more of the first through twenty-third aspects, a default downlink beam for physical downlink shared channel (PDSCH) and channel state information reference signal (CSI-RS) communications is in accordance with a TCI state of a lowest control resource set (CORESET) identifier associated with a CORESET with an available TCI state for SBFD downlink transmissions, wherein the UE is not configured with unified TCI information.

In a twenty-fifth additional aspect, alone or in combination with one or more of the first through twenty-fourth aspects, a plurality of CORESETs that includes the CORESET is divided into two groups in accordance with a plurality of transmission reception points (TRPs), and wherein the lowest CORESET identifier corresponds to a lowest CORESET identifier that is mapped to a downlink available TRP of the plurality of TRPs.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
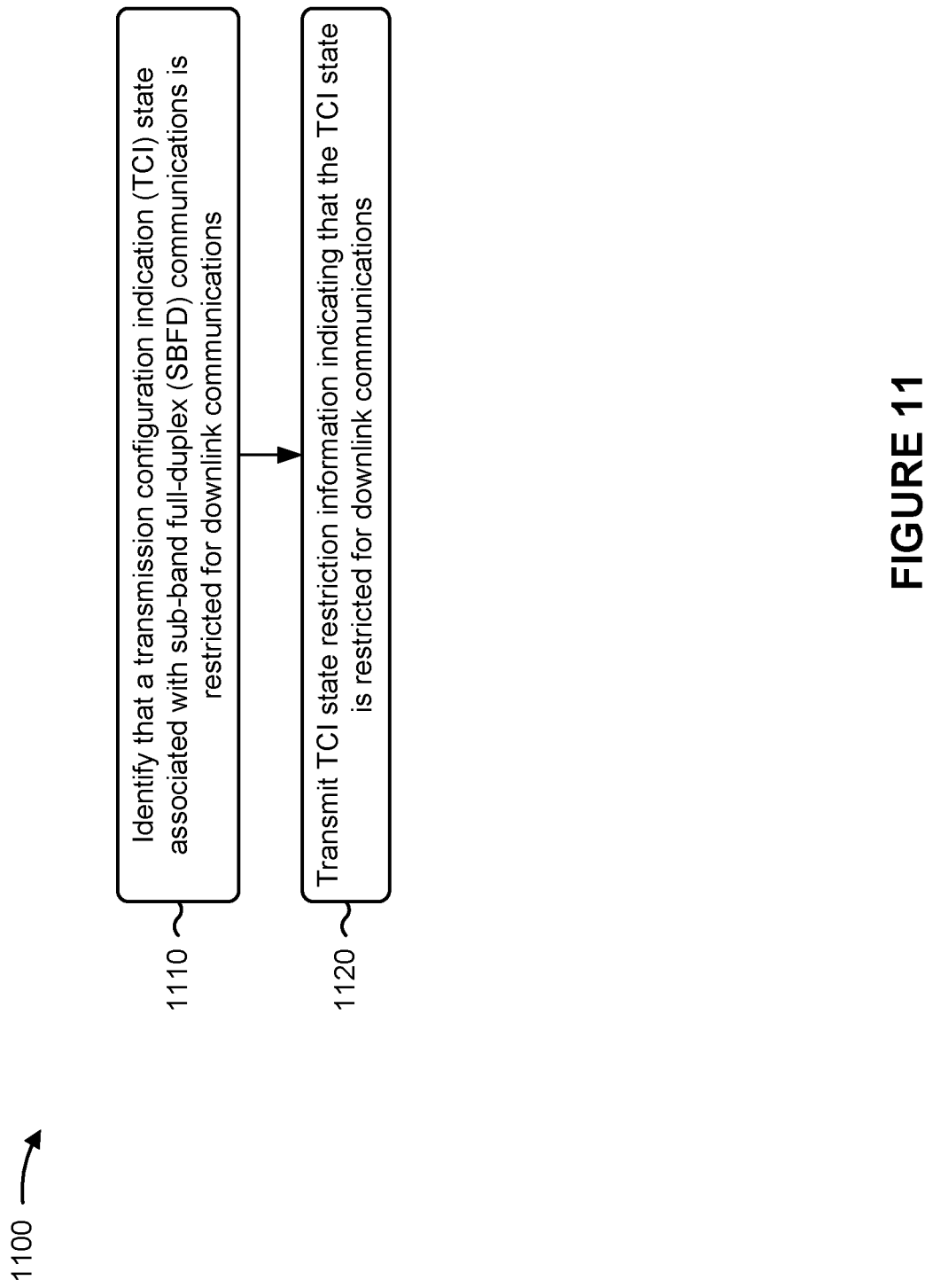
FIG. 11 is a flowchart illustrating an example process performed, for example, by a network node that supports wireless communication in accordance with the present disclosure.

FIG. 11 is a flowchart illustrating an example process 1100 performed, for example, by a network node that supports wireless communications accordance with the present disclosure. Example process 1100 is an example where the network node (for example, network node 110) performs operations associated with TCI state restriction.

As shown in FIG. 11, in some aspects, process 1100 may include identifying that a TCI state associated with SBFD communications is restricted for downlink communications (block 1110). For example, the network node (such as by using communication manager 150 or identifying component 1308, depicted in FIG. 13) may identify that a TCI state associated with SBFD communications is restricted for downlink communications, as described above.

As further shown in FIG. 11, in some aspects, process 1100 may include transmitting TCI state restriction information indicating that the TCI state is restricted for downlink communications (block 1120). For example, the network node (such as by using communication manager 150 or transmission component 1304, depicted in FIG. 13) may transmit TCI state restriction information indicating that the TCI state is restricted for downlink communications, as described above.

Process 1100 may include additional aspects, such as any single aspect or any combination of aspects described below or in connection with one or more other processes described elsewhere herein.

In a first additional aspect, transmitting the TCI state restriction information comprises transmitting a TCI codepoint associated with unified TCI information that indicates a duplex-specific uplink TCI state, a duplex-specific downlink TCI state, or a duplex-specific joint uplink and downlink TCI state.

In a second additional aspect, alone or in combination with the first aspect, transmitting the TCI state restriction information comprises transmitting RRC information or MAC information indicating that the TCI state is restricted for downlink communications within SBFD symbols or slots.

In a third additional aspect, alone or in combination with one or more of the first and second aspects, the RRC information or the MAC information includes a bit indicating that a downlink TCI is not available in one or more SBFD symbols or slots.

In a fourth additional aspect, alone or in combination with one or more of the first through third aspects, the MAC information activates two downlink TCI states associated with a TCI codepoint, a first downlink TCI state of the two downlink TCI states being associated with half-duplex downlink communications in non-SBFD symbols and a second downlink TCI state of the two downlink TCI states being associated with downlink communications in SBFD symbols or slots.

In a fifth additional aspect, alone or in combination with one or more of the first through fourth aspects, the MAC information includes a bit indicating whether the TCI state is associated with half-duplex downlink communications or SBFD downlink communications.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
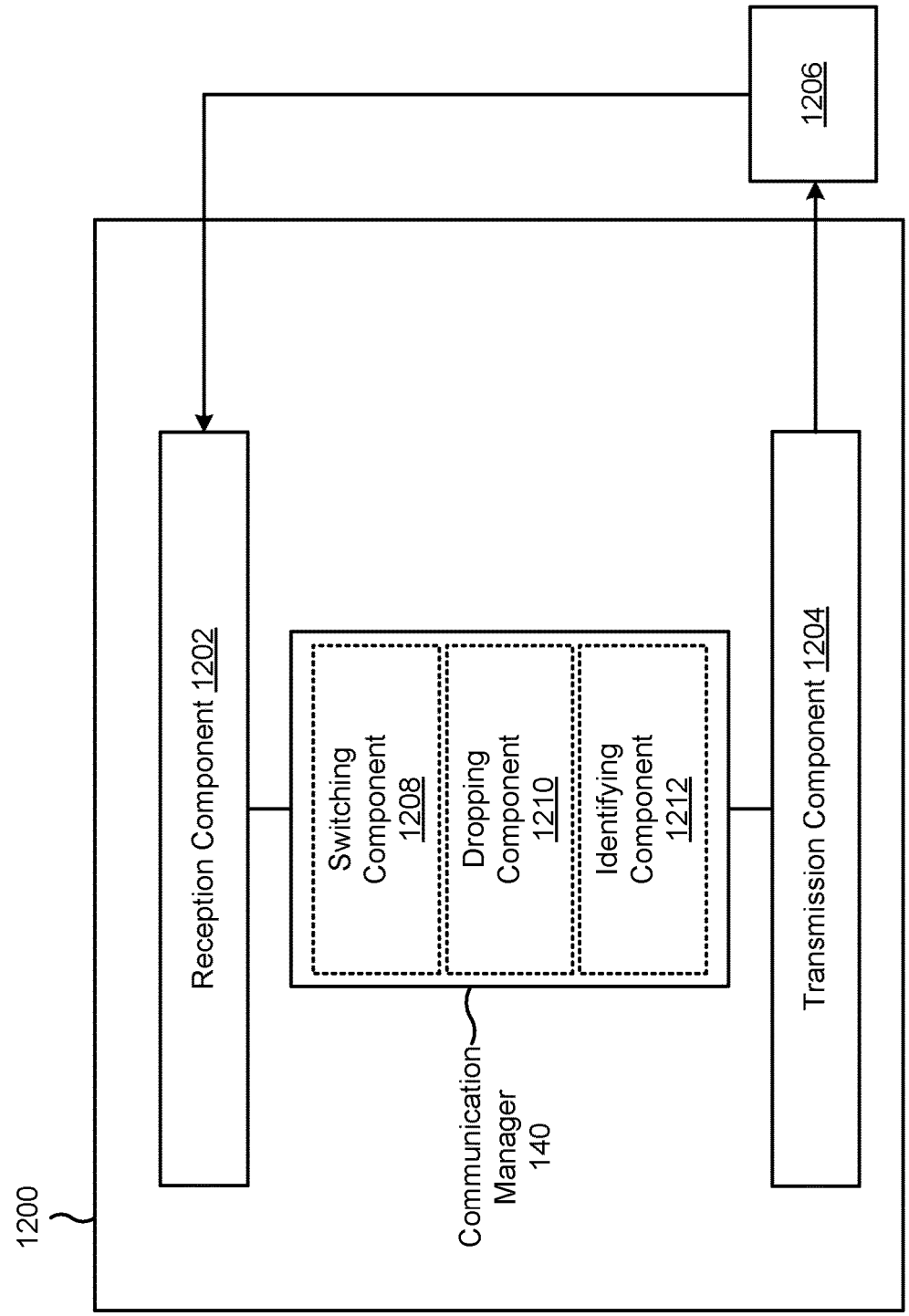
FIG. 12 is a diagram of an example apparatus for wireless communication that supports TCI state restriction for SBFD communications in accordance with the present disclosure.

FIG. 12 is a diagram of an example apparatus 1200 for wireless communication that supports wireless communications in accordance with the present disclosure. The apparatus 1200 may be a UE, or a UE may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a network node, or another wireless communication device) using the reception component 1202 and the transmission component 1204.

In some aspects, the apparatus 1200 may be configured to and/or operable to perform one or more operations described herein in connection with FIGS. 6-9. Additionally or alternatively, the apparatus 1200 may be configured to and/or operable to perform one or more processes described herein, such as process 1000 of FIG. 10. In some aspects, the apparatus 1200 may include one or more components of the UE described above in connection with FIG. 2.

The reception component 1202 may receive communications, such as reference signals, control information, and/or data communications, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, and/or a memory of the UE described above in connection with FIG. 2.

The transmission component 1204 may transmit communications, such as reference signals, control information, and/or data communications, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, and/or a memory of the UE described above in connection with FIG. 2. In some aspects, the transmission component 1204 may be co-located with the reception component 1202 in a transceiver.

The communication manager 140 may receive or may cause the reception component 1202 to receive TCI state restriction information indicating that a TCI state associated with SBFD communications is restricted for downlink communications. The communication manager 140 may communicate in accordance with the TCI state restriction information. In some aspects, the communication manager 140 may perform one or more operations described elsewhere herein as being performed by one or more components of the communication manager 140.

The communication manager 140 may include a controller/processor, and/or a memory of the UE described above in connection with FIG. 2. In some aspects, the communication manager 140 includes a set of components, such as a switching component 1208, a dropping component 1210, and/or an identifying component 1212. Alternatively, the set of components may be separate and distinct from the communication manager 140. In some aspects, one or more components of the set of components may include or may be implemented within a controller/processor, and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive TCI state restriction information indicating that a TCI state associated with SBFD communications is restricted for downlink communications. The transmission component 1202 may communicate in accordance with the TCI state restriction information.

The switching component 1208 may switch a beam across a slot boundary and performing PDSCH repetition using another beam in accordance with the UE being configured to perform downlink PDSCH repetition across SBFD symbols and non-SBFD symbols and in accordance with the UE being configured with unified TCI information. The reception component 1202 may perform PDSCH repetition in accordance with the UE being configured to perform downlink PDSCH repetition across SBFD symbols and non-SBFD symbols and in accordance with the UE not being configured with unified TCI information. The reception component 1202 may receive downlink control information that indicates a first TCI state associated with half-duplex downlink communications and a second TCI state associated with full-duplex downlink communications, wherein each PDSCH occasion of a plurality of PDSCH occasions indicates one of the first TCI state or the second TCI state.

The reception component 1202 may receive DCI that indicates a single TCI state associated with PDSCH repetition across SBFD symbols and non-SBFD symbols. The dropping component 1210 may drop one or more PDSCH occasions within the SBFD symbols. The identifying component 1212 may determine that the single TCI state is available in the SBFD symbols. The reception component 1202 may receive one or more PDSCH occasions within the SBFD symbols. The reception component 1202 may receive a configured grant for SPS for a PDSCH associated with a first duplex mode, wherein the UE is configured to drop an SPS transmission occasion in accordance with the SPS transmission occasion being associated with a second duplex mode that is different than the first duplex mode. The reception component 1202 may receive a configured grant for SPS for a PDSCH across a plurality of duplex modes that indicates a plurality of parameters, each parameter of the plurality of parameters corresponding to a duplex mode of the plurality of duplex modes. The dropping component 1210 may drop an SPS occasion of a plurality of SPS occasions associated with a non-available TCI state, wherein the SPS is used across a plurality of duplex modes, and wherein activating downlink control information indicates that a single TCI state is to be used across the plurality of duplex modes.

The reception component 1202 may receive DCI that schedules a plurality of PDSCH occasions over a plurality of non-consecutive slots, wherein the plurality of PDSCH occasions share a same modulation and coding scheme and frequency domain resource allocation, and wherein each PDSCH occasion is associated with a SLIV. The identifying component 1212 may identify a duplex mode associated with a PDSCH occasion or a SLIV occasion, wherein communicating comprises receiving using a TCI state corresponding to the duplex mode, wherein the UE is configured with unified TCI information. The reception component 1202 may receive a CSI report configuration associated with a plurality of CSI-RS resources, wherein each CSI-RS resource of the plurality of CSI-RS resources corresponds to a TRP of a plurality of TRPs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
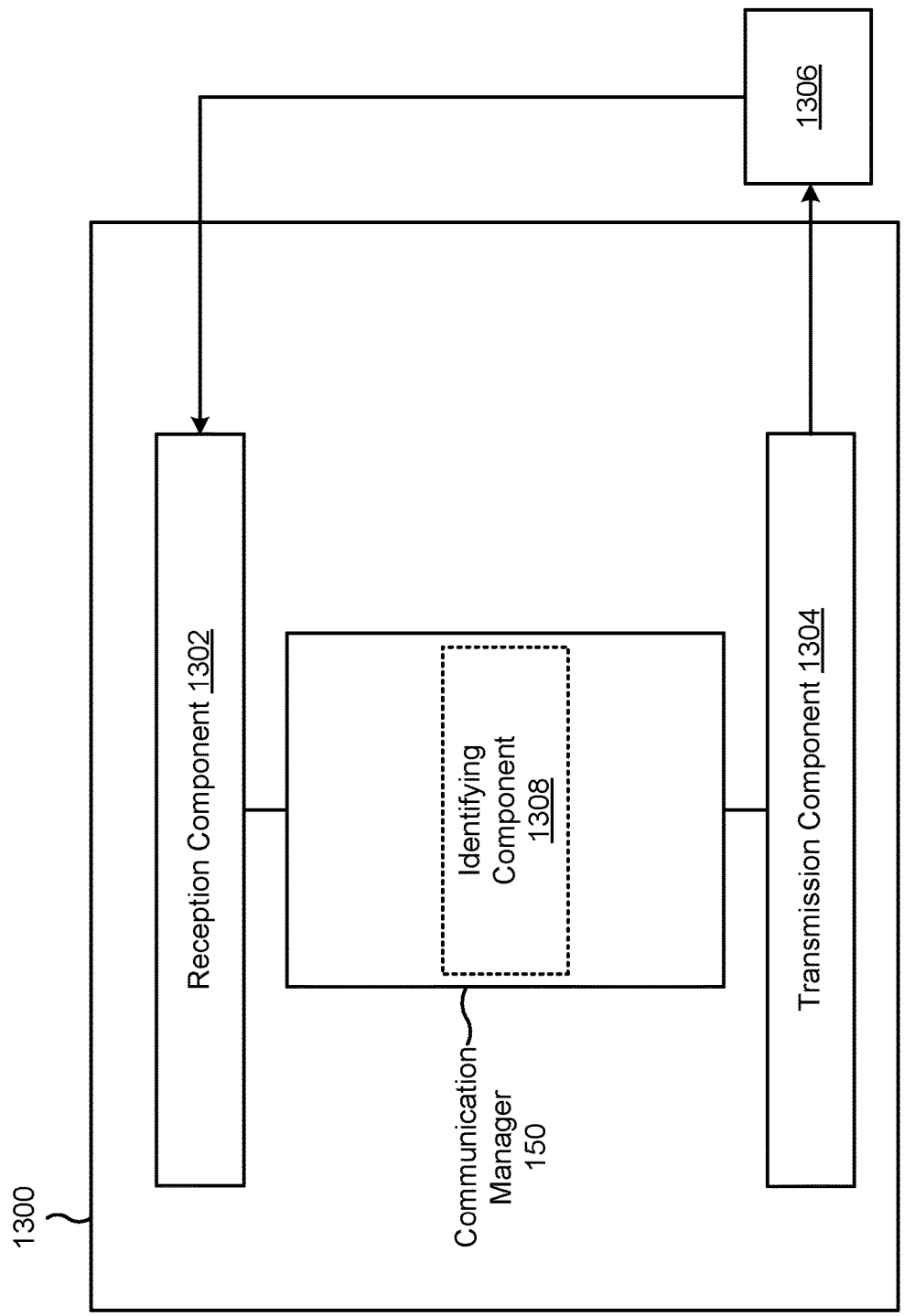
FIG. 13 is a diagram of an example apparatus for wireless communication that supports TCI state restriction for SBFD communications in accordance with the present disclosure.

FIG. 13 is a diagram of an example apparatus 1300 for wireless communication that supports wireless communications in accordance with the present disclosure. The apparatus 1300 may be a network node, or a network node may include the apparatus 1300. In some aspects, the apparatus 1300 includes a reception component 1302, a transmission component 1304, and a communication manager 150, which may be in communication with one another (for example, via one or more buses). As shown, the apparatus 1300 may communicate with another apparatus 1306 (such as a UE, a network node, or another wireless communication device) using the reception component 1302 and the transmission component 1304.

In some aspects, the apparatus 1300 may be configured to and/or operable to perform one or more operations described herein in connection with FIGS. 6-9. Additionally or alternatively, the apparatus 1300 may be configured to and/or operable to perform one or more processes described herein, such as process 1100 of FIG. 11. In some aspects, the apparatus 1300 may include one or more components of the network node described above in connection with FIG. 2.

The reception component 1302 may receive communications, such as reference signals, control information, and/or data communications, from the apparatus 1306. The reception component 1302 may provide received communications to one or more other components of the apparatus 1300, such as the communication manager 150. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, and/or a memory of the network node described above in connection with FIG. 2.

The transmission component 1304 may transmit communications, such as reference signals, control information, and/or data communications, to the apparatus 1306. In some aspects, the communication manager 150 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, and/or a memory of the network node described above in connection with FIG. 2. In some aspects, the transmission component 1304 may be co-located with the reception component 1302 in a transceiver.

The communication manager 150 may identify that a TCI state associated with SBFD communications is restricted for downlink communications. The communication manager 150 may transmit or may cause the transmission component 1304 to transmit TCI state restriction information indicating that the TCI state is restricted for downlink communications. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as an identifying component 1308. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The identifying component 1308 may identify that a TCI state associated with SBFD communications is restricted for downlink communications. The transmission component 1304 may transmit TCI state restriction information indicating that the TCI state is restricted for downlink communications.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving transmission configuration indication (TCI) state restriction information indicating that a TCI state associated with sub-band full-duplex (SBFD) communications is restricted for downlink communications; and communicating in accordance with the TCI state restriction information.

Aspect 2: The method of Aspect 1, wherein the SBFD communications are associated with multi-transmission reception point communications.

Aspect 3: The method of any of Aspects 1-2, wherein receiving the TCI state restriction information comprises receiving a TCI codepoint associated with unified TCI information that indicates a duplex-specific uplink TCI state, a duplex-specific downlink TCI state, or a duplex-specific joint uplink and downlink TCI state.

Aspect 4: The method of any of Aspects 1-3, wherein receiving the TCI state restriction information comprises receiving radio resource control (RRC) information or medium access control (MAC) information indicating that the TCI state is restricted for downlink communications within SBFD symbols or slots.

Aspect 5: The method of Aspect 4, wherein the RRC information or the MAC information includes a bit indicating that a downlink TCI is not available in one or more SBFD symbols or slots.

Aspect 6: The method of Aspect 4, wherein the MAC information activates two downlink TCI states associated with a TCI codepoint, a first downlink TCI state of the two downlink TCI states being associated with half-duplex downlink communications in non-SBFD symbols and a second downlink TCI state of the two downlink TCI states being associated with downlink communications in SBFD symbols or slots.

Aspect 7: The method of Aspect 4, wherein the MAC information includes a bit indicating whether the TCI state is associated with half-duplex downlink communications or SBFD downlink communications.

Aspect 8: The method of any of Aspects 1-7, further comprising switching a beam across a slot boundary and performing physical downlink shared channel (PDSCH) repetition using another beam in accordance with the UE being configured to perform downlink PDSCH repetition across SBFD symbols and non-SBFD symbols and in accordance with the UE being configured with unified TCI information.

Aspect 9: The method of any of Aspects 1-8, further comprising performing physical downlink shared channel (PDSCH) repetition in accordance with the UE being configured to perform downlink PDSCH repetition across SBFD symbols and non-SBFD symbols and in accordance with the UE not being configured with unified TCI information.

Aspect 10: The method of Aspect 9, further comprising receiving downlink control information that indicates a first TCI state associated with half-duplex downlink communications and a second TCI state associated with full-duplex downlink communications, wherein each PDSCH occasion of a plurality of PDSCH occasions indicates one of the first TCI state or the second TCI state.

Aspect 11: The method of Aspect 10, further comprising receiving downlink control information (DCI) that indicates a single TCI state associated with PDSCH repetition across SBFD symbols and non-SBFD symbols.

Aspect 12: The method of Aspect 11, further comprising: determining that the single TCI state is not available in the SBFD symbols; dropping one or more PDSCH occasions within the SBFD symbols; and counting the one or more dropped PDSCH occasions towards a number of PDSCH repetitions.

Aspect 13: The method of Aspect 11, further comprising: determining that the single TCI state is available in the SBFD symbols; receiving one or more PDSCH occasions within the SBFD symbols; and counting the one or more received PDSCH occasions towards a number of PDSCH repetitions.

Aspect 14: The method of any of Aspects 1-13, further comprising receiving a configured grant for semi-persistent scheduling (SPS) for a physical downlink shared channel (PDSCH) associated with a first duplex mode, wherein the UE is configured to drop an SPS transmission occasion in accordance with the SPS transmission occasion being associated with a second duplex mode that is different than the first duplex mode.

Aspect 15: The method of Aspect 14, wherein communicating comprises receiving a communication using a downlink TCI state associated with the first duplex mode in accordance with the UE being configured with unified TCI information.

Aspect 16: The method of any of Aspects 1-15, further comprising receiving a configured grant for semi-persistent scheduling (SPS) for a physical downlink shared channel (PDSCH) across a plurality of duplex modes that indicates a plurality of parameters, each parameter of the plurality of parameters corresponding to a duplex mode of the plurality of duplex modes.

Aspect 17: The method of Aspect 16, wherein the SPS is used across a plurality of duplex modes, wherein activating downlink control information indicates a plurality of TCI states to be used across the plurality of duplex modes, and wherein each SPS occasion of a plurality of SPS occasions is associated with a TCI state of the plurality of TCI states associated with a duplex mode for the SPS occasion.

Aspect 18: The method of Aspect 16, further comprising dropping an SPS occasion of a plurality of SPS occasions associated with a non-available TCI state, wherein the SPS is used across a plurality of duplex modes, and wherein activating downlink control information indicates that a single TCI state is to be used across the plurality of duplex modes.

Aspect 19: The method of any of Aspects 1-18, further comprising receiving downlink control information (DCI) that schedules a plurality of physical downlink shared channel (PDSCH) occasions over a plurality of non-consecutive slots, wherein the plurality of PDSCH occasions share a same modulation and coding scheme and frequency domain resource allocation, and wherein each PDSCH occasion is associated with a start and length indicator value (SLIV).

Aspect 20: The method of Aspect 19, further comprising identifying a duplex mode associated with a PDSCH occasion or a SLIV occasion, wherein communicating comprises receiving using a TCI state corresponding to the duplex mode, wherein the UE is configured with unified TCI information.

Aspect 21: The method of Aspect 19, wherein the DCI indicates a plurality of TCI states, each TCI state of the plurality of TCI states corresponding to a duplex mode.

Aspect 22: The method of Aspect 21, wherein the DCI indicates a single TCI state for reception across SBFD symbols and non-SBFD symbols, wherein the TCI state is restricted for the SBFD symbols, and wherein the method further comprises dropping a PDSCH reception in one or more non-SBFD slots and skipping incrementing a hybrid automatic repeat request (HARQ) process counter.

Aspect 23: The method of any of Aspects 1-22, further comprising: receiving a channel state information (CSI) report configuration associated with a plurality of CSI reference signal (CSI-RS) resources, wherein each CSI-RS resource of the plurality of CSI-RS resources corresponds to a transmission reception point (TRP) of a plurality of TRPs; selecting a CSI-RS resource from the plurality of CSI-RS resources in accordance with a CSI-RS resource indicator (CRI); and interpreting the CRI in accordance with a plurality of channel measurement resources corresponding to the plurality of CSI-RS resources.

Aspect 24: The method of Aspect 23, wherein the plurality of channel measurement resources are associated with a plurality of groups within a same resource set and are associated with different TRPs of the plurality of TRPs.

Aspect 25: The method of any of Aspects 1-24, wherein a default downlink beam for physical downlink shared channel (PDSCH) and channel state information reference signal (CSI-RS) communications is in accordance with a TCI state of a lowest control resource set (CORESET) identifier associated with a CORESET with an available TCI state for SBFD downlink transmissions, wherein the UE is not configured with unified TCI information.

Aspect 26: The method of Aspect 25, wherein a plurality of CORESETs that includes the CORESET is divided into two groups in accordance with a plurality of transmission reception points (TRPs), and wherein the lowest CORESET identifier corresponds to a lowest CORESET identifier that is mapped to a downlink available TRP of the plurality of TRPs.

Aspect 27: A method of wireless communication performed by a network node, comprising: identifying that a transmission configuration indication (TCI) state associated with sub-band full-duplex (SBFD) communications is restricted for downlink communications; and transmitting TCI state restriction information indicating that the TCI state is restricted for downlink communications.

Aspect 28: The method of Aspect 27, wherein transmitting the TCI state restriction information comprises transmitting a TCI codepoint associated with unified TCI information that indicates a duplex-specific uplink TCI state, a duplex-specific downlink TCI state, or a duplex-specific joint uplink and downlink TCI state.

Aspect 29: The method of any of Aspects 27-28, wherein transmitting the TCI state restriction information comprises transmitting radio resource control (RRC) information or medium access control (MAC) information indicating that the TCI state is restricted for downlink communications within SBFD symbols or slots.

Aspect 30: The method of Aspect 29, wherein the RRC information or the MAC information includes a bit indicating that a downlink TCI is not available in one or more SBFD symbols or slots.

Aspect 31: The method of Aspect 29, wherein the MAC information activates two downlink TCI states associated with a TCI codepoint, a first downlink TCI state of the two downlink TCI states being associated with half-duplex downlink communications in non-SBFD symbols and a second downlink TCI state of the two downlink TCI states being associated with downlink communications in SBFD symbols or slots.

Aspect 32: The method of Aspect 29, wherein the MAC information includes a bit indicating whether the TCI state is associated with half-duplex downlink communications or SBFD downlink communications.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one memory; and
   at least one processor coupled with the at least one memory, the at least one processor operable to cause the UE to:
      receive transmission configuration indication (TCI) state restriction information indicating that a TCI state associated with sub-band full-duplex (SBFD) communications is restricted for downlink communications; and
      communicate in accordance with the TCI state restriction information.

2. The UE of claim 1, wherein the SBFD communications are associated with multi-transmission reception point communications.

3. The UE of claim 1, wherein, to cause the UE to receive the TCI state restriction information, the at least one processor is operable to cause the UE to receive a TCI codepoint associated with unified TCI information that indicates a duplex-specific uplink TCI state, a duplex-specific downlink TCI state, or a duplex-specific joint uplink and downlink TCI state.

4. The UE of claim 1, wherein, to cause the UE to receive the TCI state restriction information, the at least one processor is operable to cause the UE to receive radio resource control (RRC) information or medium access control (MAC) information indicating that the TCI state is restricted for downlink communications within SBFD symbols or slots.

5. The UE of claim 4, wherein the RRC information or the MAC information includes a bit indicating that a downlink TCI is not available in one or more SBFD symbols or slots.

6. The UE of claim 4, wherein the MAC information activates two downlink TCI states associated with a TCI codepoint, a first downlink TCI state of the two downlink TCI states being associated with half-duplex downlink communications in non-SBFD symbols and a second downlink TCI state of the two downlink TCI states being associated with downlink communications in SBFD symbols or slots.

7. The UE of claim 4, wherein the MAC information includes a bit indicating whether the TCI state is associated with half-duplex downlink communications or SBFD downlink communications.

8. The UE of claim 1, wherein the at least one processor is further operable to cause the UE to switch a beam across a slot boundary and perform physical downlink shared channel (PDSCH) repetition using another beam in accordance with the UE being configured to perform downlink PDSCH repetition across SBFD symbols and non-SBFD symbols and in accordance with the UE being configured with unified TCI information.

9. The UE of claim 1, wherein the at least one processor is further operable to cause the UE to perform physical downlink shared channel (PDSCH) repetition in accordance with the UE being configured to perform downlink PDSCH repetition across SBFD symbols and non-SBFD symbols and in accordance with the UE not being configured with unified TCI information.

10. The UE of claim 9, wherein the at least one processor is further operable to cause the UE to receive downlink control information that indicates a first TCI state associated with half-duplex downlink communications and a second TCI state associated with full-duplex downlink communications, wherein each PDSCH occasion of a plurality of PDSCH occasions indicates one of the first TCI state or the second TCI state.

11. The UE of claim 10, wherein the at least one processor is further operable to cause the UE to receive downlink control information (DCI) that indicates a single TCI state associated with PDSCH repetition across SBFD symbols and non-SBFD symbols.

12. The UE of claim 11, wherein the at least one processor is further operable to cause the UE to:
determine that the single TCI state is not available in the SBFD symbols;
drop one or more PDSCH occasions within the SBFD symbols; and
count the one or more dropped PDSCH occasions towards a number of PDSCH repetitions.

13. The UE of claim 11, wherein the at least one processor is further operable to cause the UE to:
determine that the single TCI state is available in the SBFD symbols;
receive one or more PDSCH occasions within the SBFD symbols; and
count the one or more received PDSCH occasions towards a number of PDSCH repetitions.

14. The UE of claim 1, wherein the at least one processor is further operable to cause the UE to receive a configured grant for semi-persistent scheduling (SPS) for a physical downlink shared channel (PDSCH) associated with a first duplex mode, wherein the UE is configured to drop an SPS transmission occasion in accordance with the SPS transmission occasion being associated with a second duplex mode that is different than the first duplex mode.

15. The UE of claim 14, wherein, to cause the UE to communicate, the at least one processor is operable to cause the UE to receive a communication using a downlink TCI state associated with the first duplex mode in accordance with the UE being configured with unified TCI information.

16. The UE of claim 1, wherein the at least one processor is further operable to cause the UE to receive a configured grant for semi-persistent scheduling (SPS) for a physical downlink shared channel (PDSCH) across a plurality of duplex modes that indicates a plurality of parameters, each parameter of the plurality of parameters corresponding to a duplex mode of the plurality of duplex modes.

17. The UE of claim 16, wherein the SPS is used across a plurality of duplex modes, wherein activating downlink control information indicates a plurality of TCI states to be used across the plurality of duplex modes, and wherein each SPS occasion of a plurality of SPS occasions is associated with a TCI state of the plurality of TCI states associated with a duplex mode for the SPS occasion.

18. The UE of claim 16, wherein the at least one processor is further operable to cause the UE to drop an SPS occasion of a plurality of SPS occasions associated with a non-available TCI state, wherein the SPS is used across a plurality of duplex modes, and wherein activating downlink control information indicates that a single TCI state is to be used across the plurality of duplex modes.

19. The UE of claim 1, wherein the at least one processor is further operable to cause the UE to receive downlink control information (DCI) that schedules a plurality of physical downlink shared channel (PDSCH) occasions over a plurality of non-consecutive slots, wherein the plurality of PDSCH occasions share a same modulation and coding scheme and frequency domain resource allocation, and wherein each PDSCH occasion is associated with a start and length indicator value (SLIV).

20. The UE of claim 19, wherein the at least one processor is further operable to cause the UE to identify a duplex mode associated with a PDSCH occasion or a SLIV occasion, wherein communicating comprises receiving using a TCI state corresponding to the duplex mode, wherein the UE is configured with unified TCI information.

21. The UE of claim 19, wherein the DCI indicates a plurality of TCI states, each TCI state of the plurality of TCI states corresponding to a duplex mode.

22. The UE of claim 21, wherein the DCI indicates a single TCI state for reception across SBFD symbols and non-SBFD symbols, wherein the TCI state is restricted for the SBFD symbols, and wherein the at least one processor is further operable to cause the UE to drop a PDSCH reception in one or more non-SBFD slots and to skip incrementing a hybrid automatic repeat request (HARQ) process counter.

23. The UE of claim 1, wherein the at least one processor is further operable to cause the UE to:
receive a channel state information (CSI) report configuration associated with a plurality of CSI reference signal (CSI-RS) resources, wherein each CSI-RS resource of the plurality of CSI-RS resources corresponds to a transmission reception point (TRP) of a plurality of TRPs;
select a CSI-RS resource from the plurality of CSI-RS resources in accordance with a CSI-RS resource indicator (CRI); and
interpret the CRI in accordance with a plurality of channel measurement resources corresponding to the plurality of CSI-RS resources.

24. The UE of claim 23, wherein the plurality of channel measurement resources are associated with a plurality of groups within a same resource set and are associated with different TRPs of the plurality of TRPs.

25. The UE of claim 1, wherein a default downlink beam for physical downlink shared channel (PDSCH) and channel state information reference signal (CSI-RS) communications is in accordance with a TCI state of a lowest control resource set (CORESET) identifier associated with a CORESET with an available TCI state for SBFD downlink transmissions, wherein the UE is not configured with unified TCI information.

26. A network node for wireless communication, comprising:
at least one memory; and
at least one processor coupled with the at least one memory, the at least one processor operable to cause the network node to:
identify that a transmission configuration indication (TCI) state associated with sub-band full-duplex (SBFD) communications is restricted for downlink communications; and
transmit TCI state restriction information indicating that the TCI state is restricted for downlink communications.

27. The network node of claim 26, wherein, to cause the network node to transmit the TCI state restriction information, the at least one processor is operable to cause the network node to transmit a TCI codepoint associated with unified TCI information that indicates a duplex-specific uplink TCI state, a duplex-specific downlink TCI state, or a duplex-specific joint uplink and downlink TCI state.

28. The network node of claim 26, wherein, to cause the network node to transmit the TCI state restriction information, the at least one processor is operable to cause the network node to transmit radio resource control (RRC) information or medium access control (MAC) information indicating that the TCI state is restricted for downlink communications within SBFD symbols or slots.

29. A method of wireless communication performed by a user equipment (UE), comprising:
- receiving transmission configuration indication (TCI) state restriction information indicating that a TCI state associated with sub-band full-duplex (SBFD) communications is restricted for downlink communications; and
- communicating in accordance with the TCI state restriction information.

30. A method of wireless communication performed by a network node, comprising:
- identifying that a transmission configuration indication (TCI) state associated with sub-band full-duplex (SBFD) communications is restricted for downlink communications; and
- transmitting TCI state restriction information indicating that the TCI state is restricted for downlink communications.

* * * * *